(12) United States Patent  
Noguchi et al.

(10) Patent No.: US 8,049,917 B2  
(45) Date of Patent: Nov. 1, 2011

(54) IMAGE PROCESSING DEVICE, IMAGE PROCESSING SYSTEM, RECORDING MEDIUM STORING IMAGE PROCESSING PROGRAM, IMAGE PROCESSING METHOD AND DATA SIGNAL

(75) Inventors: Takeshi Noguchi, Kanagawa (JP); Kenji Ebitani, Kanagawa (JP); Mariko Ogi, Kanagawa (JP); Hirofumi Komatsubara, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 689 days.

(21) Appl. No.: 12/170,838

(22) Filed: Jul. 10, 2008

(65) Prior Publication Data

US 2009/0161149 A1    Jun. 25, 2009

(30) Foreign Application Priority Data

Dec. 21, 2007    (JP) ................... 2007-330296

(51) Int. Cl.
- *G06F 3/12* (2006.01)
- *G06K 15/00* (2006.01)
- *H04N 1/40* (2006.01)

(52) U.S. Cl. ............... 358/1.15; 358/1.14; 358/3.28
(58) Field of Classification Search ............ 358/1.15, 358/1.14, 3.28, 1.1; 399/366; 380/54, 55; 718/106, 102

See application file for complete search history.

(56) References Cited

U.S. PATENT DOCUMENTS 7,450,895 B2 * 11/2008 Oomura et al. ............ 399/366  
7,730,490 B2 *  6/2010 Ito .............................. 718/106

FOREIGN PATENT DOCUMENTS

JP    A 2005-151149    6/2005

* cited by examiner

*Primary Examiner* — Charlotte M Baker  
*(74) Attorney, Agent, or Firm* — Oliff & Berridge, PLC

(57) ABSTRACT

An image processing device, which includes a reading section that reads image information on both sides; an inquiry section that inquires operational authority; and an execution section that executes a desired operation if the operational authority exists, wherein the document is synthesizedly printed, and the image processing device further includes: an extraction section that extracts added image information; a first determining section that, if the added image information is not extracted, determines whether the information is included in a next surface or in a preceding surface; a second determining section that, if included, determines whether a attribute is imparted to the information, and whether a logical page number agrees with a logical total number of pages; and an image processing section that, if the attribute is imparted and the numbers agree, ignores the image information of the printing surface, and subjects image information of another surface to image processing.

17 Claims, 25 Drawing Sheets

FIG.8

OPERATIONAL AUTHORITY INFORMATION MANAGEMENT TABLE ~ 431

| DOCUMENT ID | DOCUMENT OPERATIONAL AUTHORITY | | | | | | | | | | | | |
|---|---|---|---|---|---|---|---|---|---|---|---|---|---|
| | VIEW | | | PRINT | | | SCAN | | | COPY | | | ... |
| | SECURITY LEVEL | | | SECURITY LEVEL | | | SECURITY LEVEL | | | SECURITY LEVEL | | | |
| | a | b | c | a | b | c | a | b | c | a | b | c | ... |
| docu001 | 1 | 1 | 1 | 1 | 1 | | 1 | 1 | | 1 | 1 | | ... |
| docu002 | 1 | 1 | 1 | 1 | 1 | | 1 | 1 | | 1 | 1 | | ... |
| ...... | ........ | ........ | ........ | ........ | ........ | ........ | ........ | ........ | ........ | ........ | ........ | ........ | ........ |

222-1a

PRINT DOCUMENT ATTRIBUTE MANAGEMENT TABLE

| PAGE ID | LOGICAL PAGE NUMBER | DOCUMENT ID |
|---|---|---|
| P0011 | 1 | docu001 |
| P0012 | 2 | docu001 |
| P0013 | 3 | docu001 |
| P0014 | 4 | docu001 |
| P0015 | 5 | docu001 |
| P0021 | 1 | docu002 |
| P0022 | 2 | docu002 |
| ⋮ | ⋮ | ⋮ |

222-2a

PRINT DOCUMENT ATTRIBUTE MANAGEMENT TABLE

| DOCUMENT ID | TOTAL PAGE | TWO-SIDED PRINT |
|---|---|---|
| docu001 | 5 | true |
| docu002 | 70 | false |
| ⋮ | ⋮ | ⋮ |

| PRINT DOCUMENT ATTRIBUTE MANAGEMENT TABLE | | |
|---|---|---|
| PAGE ID | REAR SIDE MARK PRESENCE IDENTIFIER | DOCUMENT ID |
| P0011 | true | docu001 |
| P0012 | true | docu001 |
| P0013 | true | docu001 |
| P0014 | true | docu001 |
| P0015 | false | docu001 |
| P0021 | true | docu002 |
| P0022 | true | docu002 |
| ⋮ | ⋮ | ⋮ |

222-2b

| PRINT DOCUMENT ATTRIBUTE MANAGEMENT TABLE | |
|---|---|
| DOCUMENT ID | TOTAL PAGE |
| docu001 | 5 |
| docu002 | 70 |
| ⋮ | ⋮ |

FIG.18

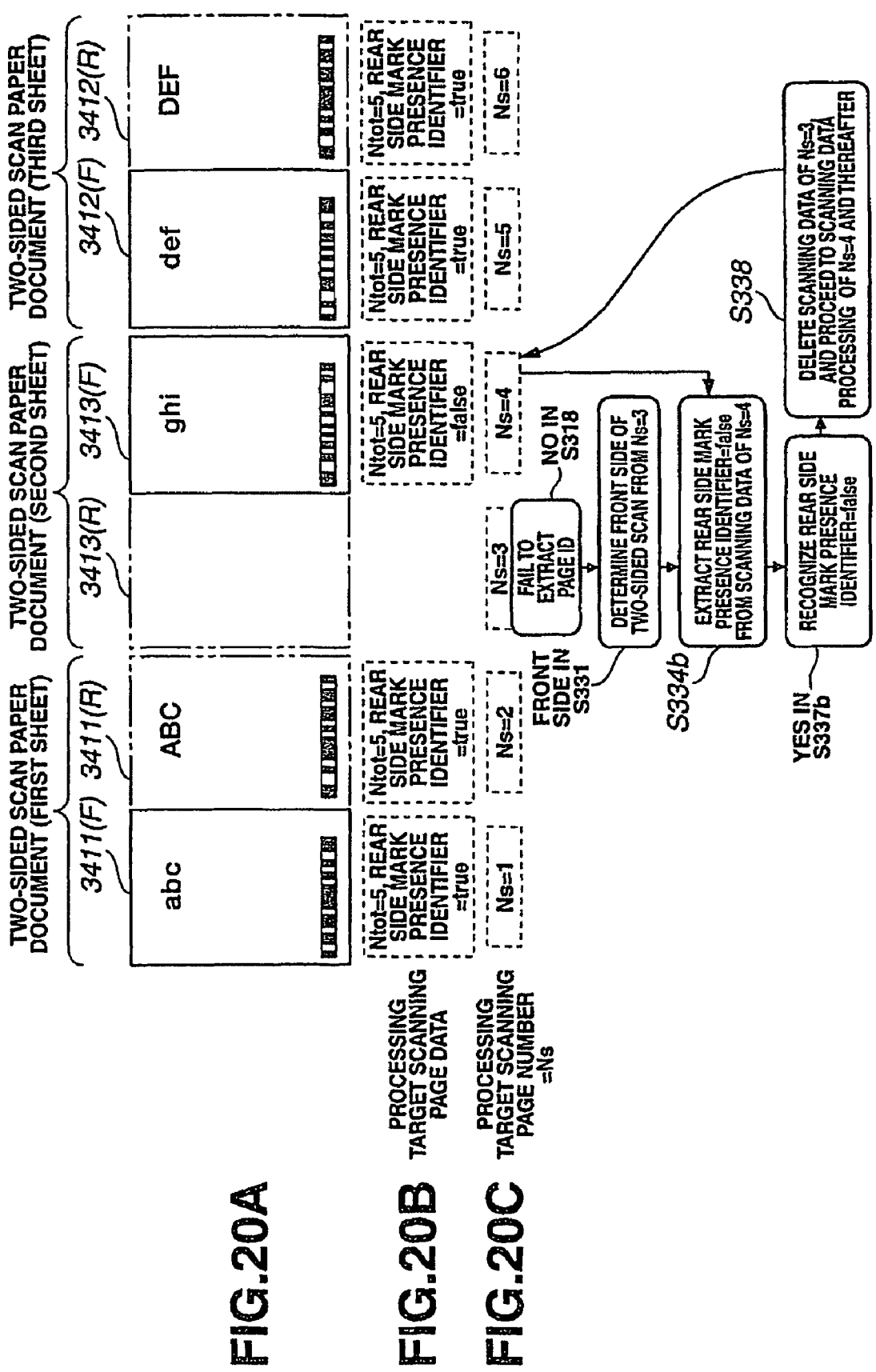

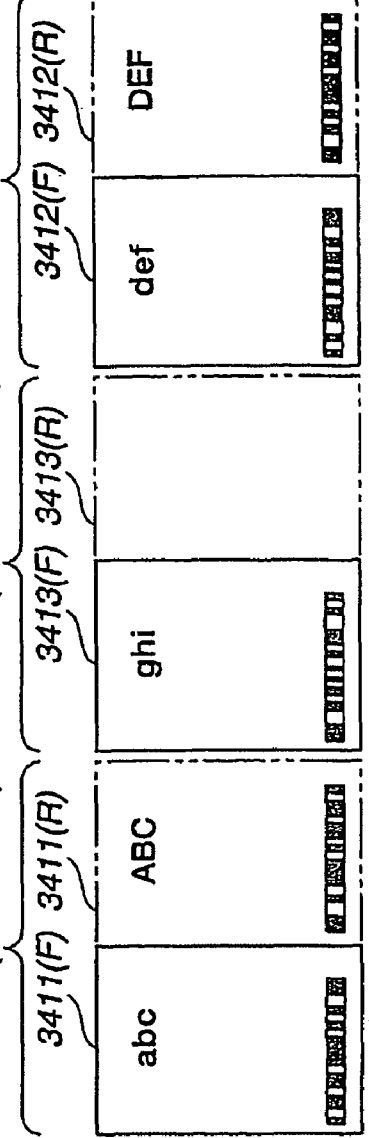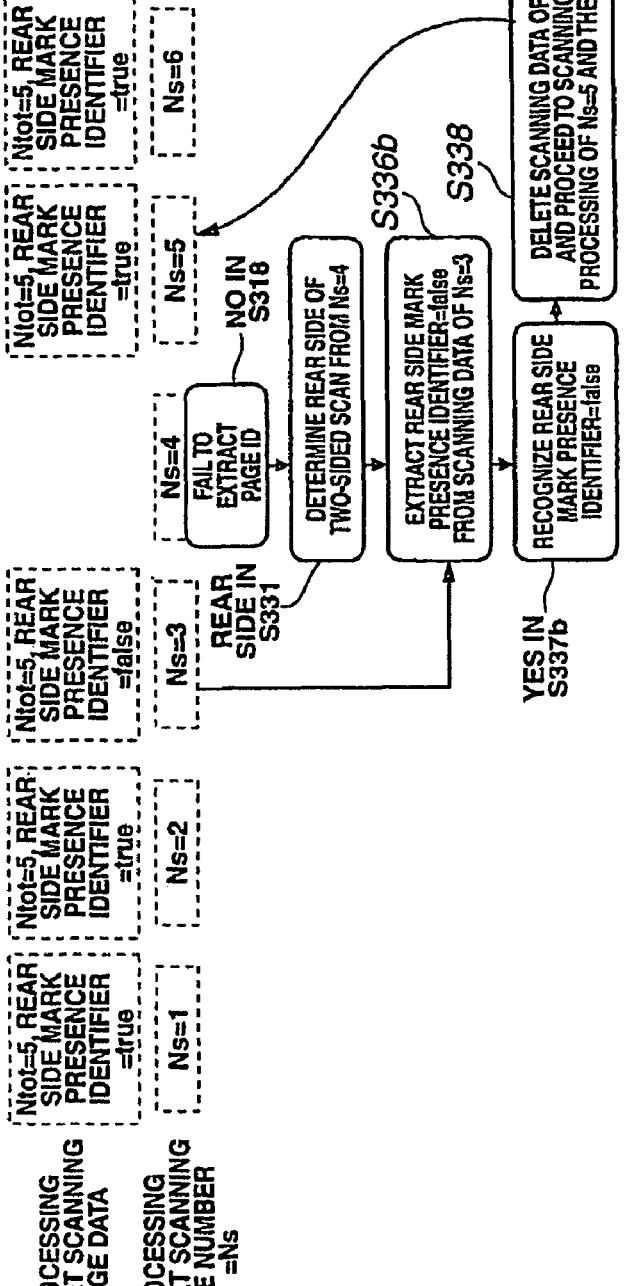

222-1c

| PRINT DOCUMENT ATTRIBUTE MANAGEMENT TABLE | |
|---|---|
| PAGE ID | DOCUMENT ID |
| P0011 | docu001 |
| P0012 | docu001 |
| P0013 | docu001 |
| P0014 | docu001 |
| P0015 | docu001 |
| 00000 | null |
| P0021 | docu002 |
| P0022 | docu002 |
| ⋮ | ⋮ |

222-2c

| PRINT DOCUMENT ATTRIBUTE MANAGEMENT TABLE | |
|---|---|
| DOCUMENT ID | TOTAL PAGE |
| docu001 | 5 |
| docu002 | 70 |
| ⋮ | ⋮ |

FIG.24

IMAGE PROCESSING DEVICE, IMAGE PROCESSING SYSTEM, RECORDING MEDIUM STORING IMAGE PROCESSING PROGRAM, IMAGE PROCESSING METHOD AND DATA SIGNAL

CROSS-REFERENCE TO RELATED APPLICATION

This application is based on and claims priority under 35 USC 119 from Japanese Patent Application No. 2007-330296 filed on Dec. 21, 2007.

BACKGROUND

1. Technical Field

The present invention relates to an image processing device, an image processing system, a recording medium storing an image processing program, an image processing method and a data signal.

2. Related Art

In a system environment in which a client PC, a printer or a multifunctional device, a document management server, and the like are arranged, a configuration is known in which, from the perspective of strengthening security for processing such as acquisition of electronic document data, printing the electronic document data on paper, and scanning or copying a document printed on the paper, in the operation of such as the scanning or copying of a document printed on the paper, for example, page identification information printed on the paper together with the document is read, and the operation is allowed within the range of an operational authority set in correspondence with the page identification information.

SUMMARY

An aspect of the present invention provides an image processing device, which includes: a reading section that reads image information on both sides of a two-sided printed paper document; an inquiry section that inquires operational authority over a desired operation of the two-sided printed paper document on the basis of the image information on both sides of the two-sided printed paper document read by the reading section; and an execution section that executes the desired operation of the image information on both sides of the two-sided printed paper document if the operational authority over the desired operation of the two-sided printed paper document is present as a result of the inquiry by the inquiry section, wherein the two-sided printed paper document is printed on each printing surface corresponding to a logical page of a document subject to printing in a state in which an added image indicating document identification information, page identification information including a logical page number, a logical total number of pages, and a two-sided print attribute indicating that two-sided printing is executed is synthesized, and the image processing device which further includes: an extraction section that fetches in a reading-effected order the image information on the each printing surface that is read from both sides of the two-sided printed paper document by the reading section, and extracts information of the added image from the image information; a first determining section that, if the extraction section cannot extract the added image information, determines whether the added image information is included in the image information of a next printing surface when the reading-effected order of the printing surface from which the added image information cannot be extracted is an odd number, and determines whether the added image information is included in the image information of a preceding printing surface when the reading-effected order of the printing surface from which the added image information cannot be extracted is an even number; a second determining section that, if the first determining section determines that the added image information is included in the image information of the printing surface, determines whether the two-sided print attribute is imparted to the added image information included in the image information of the printing surface, and whether the logical page number included in the page identification information agrees with the logical total number of pages; and an image processing section that, if the second determining section determines that the two-sided print attribute is imparted to the added image information and that the logical page number agrees with the logical total number of pages, ignores the image information of the printing surface from which the extraction section cannot extract the added image information, and subjects image information of another printing surface to image processing.

BRIEF DESCRIPTION OF THE DRAWINGS

Exemplary embodiments of the present invention will be described in detail based on the following figures, wherein:

FIG. 8 is a table illustrating an example of document operational authority information registered in a document operational authority information management table;

FIG. 11 is a table illustrating an example of information stored in a print document attribute management table in the first example;

FIG. 18 is a table illustrating an example of information stored in a print document attribute management table in the second example;

FIGS. 20A to 20C are conceptual diagrams illustrating specific examples of the two-sided scan processing operation of the paper document in the second example;

FIGS. 21A to 21C are conceptual diagrams illustrating another specific examples of the two-sided scan processing operation of the paper document in the second example;

FIG. 24 is a table illustrating an example of information stored in a print document attribute management table in the third example.

DETAILED DESCRIPTION

Referring now to the accompanying drawings, a detailed description will be given of the exemplary embodiments of the present invention.

Figure 1:
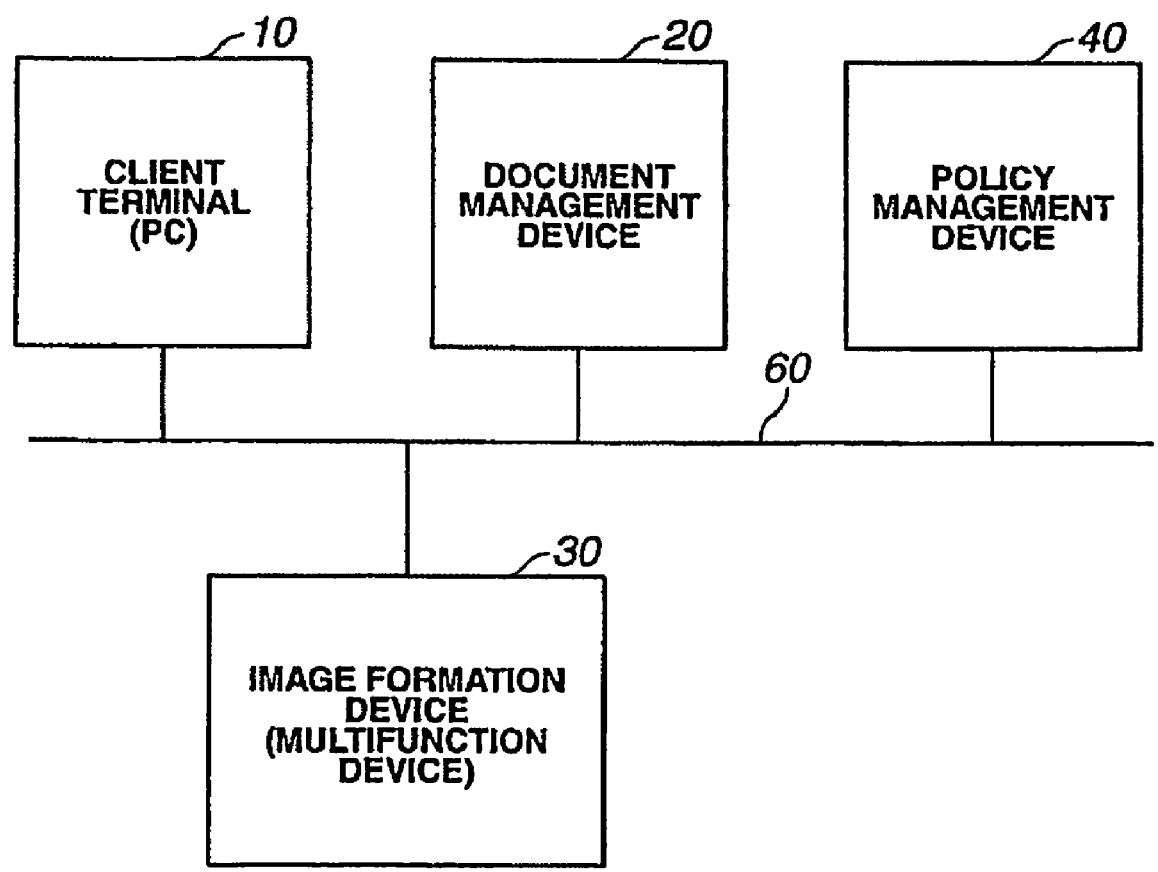
FIG. 1 is a block diagram illustrating an overall configuration of an image processing system in accordance with the present invention.

FIG. 1 is a block diagram illustrating an overall configuration of an image processing system in accordance with the invention.

This image processing system is configured by connecting various devices including a client terminal 10, a document management device 20, an image formation device 30, and a policy management device 40 via a network (NW) 60 configured by a local area network (LAN), a wide area network (WAN), or the like.

The devices are each configured by a central processing unit (CPU), a read only memory (ROM) and a random access memory (RAM) which are memories serving as main storage means, a hard disk serving as peripheral storage means, an input interface, a communication interface, and the like. A description will be given of their functional configurations with reference to FIGS. 2 to 5.

Figure 2:
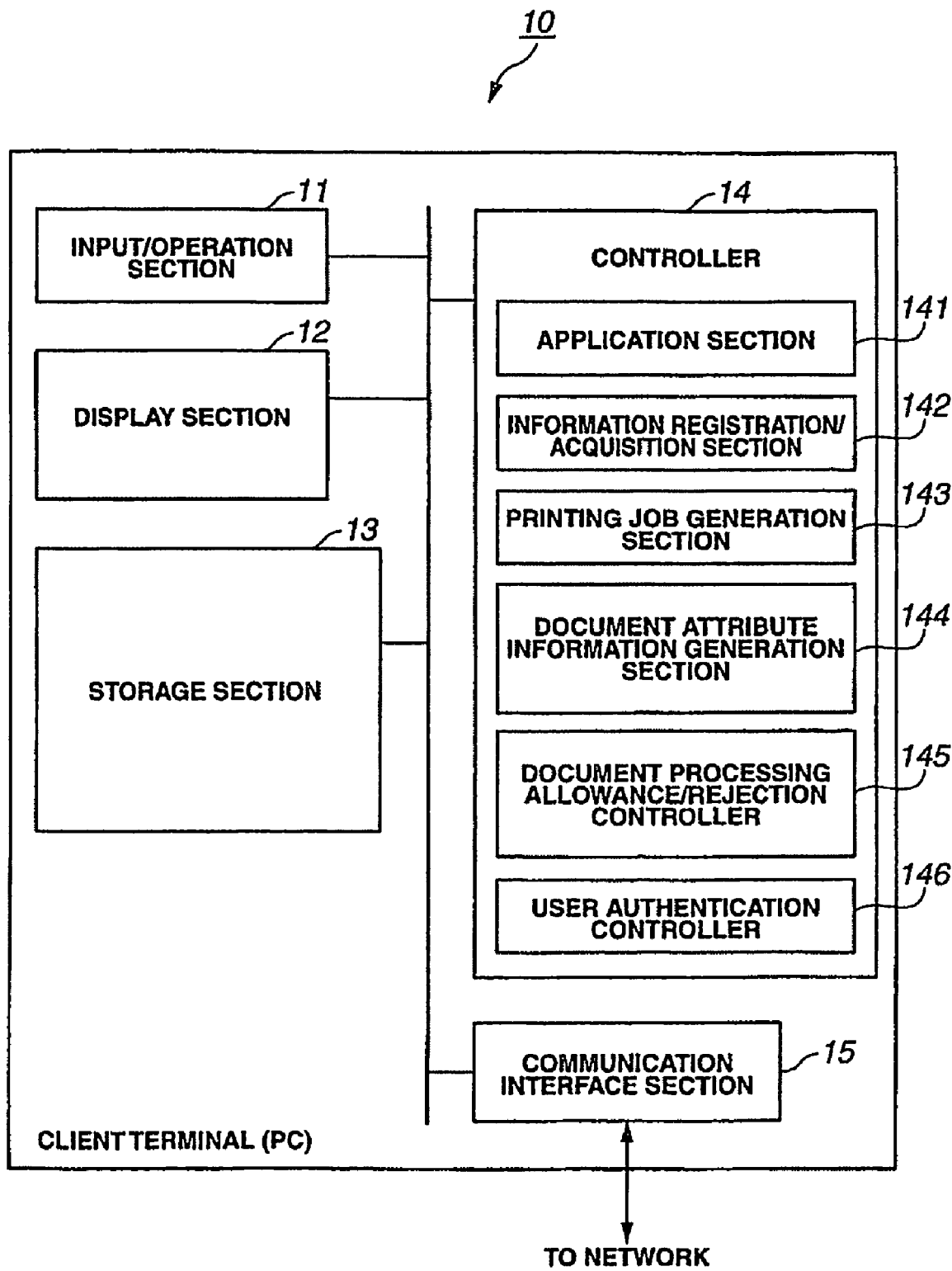
FIG. 2 is a block diagram illustrating a functional configuration of a client terminal shown in FIG. 1.

FIG. 2 is a block diagram illustrating a functional configuration of the client terminal 10 shown in FIG. 1.

The client terminal 10 is realized by a general-purpose computer such as a personal computer (PC) and, as shown in FIG. 2, it is configured by including an input/operation section 11 constituted by an input device such as a keyboard, a mouse, and the like; a display section 12 displaying various information such as operational guidance and an operating state; a storage section 13 for storing various information such as an operation program; a controller 14 for controlling the overall device; and a communication interface (I/F) section 15 acting as a communication interface at the time of communication with the document management device 20, the image formation device 30, the policy management device 40, and the like via the NW 60.

In the client terminal 10, the controller 14 is configured by including an application section 141 for performing processing concerning various operations (generation, storage, display, editing, print instruction, etc.) of a document file in correspondence with a predetermined operation by the input/operation section 11 by a user; an information registration acquisition section 142 for performing processing such as the registration processing of information of an electronic document and the like in the document management device 20 and the acquisition of information of an electronic document and the like from the document management device 20, in correspondence with a predetermined operation at the input/operation section 1; a print job generation section 143 for generating a print job containing print data of an electronic document subject to printing and its processing command on the basis of a predetermined print instruction operation at the input/operation section 11, and for sending the print job to the image formation device 30; a document-attribute-information generation section 144 for generating document attribute information corresponding to an electronic document subject to registration or printing at the time of registration processing of an electronic document by the information registration/acquisition section 142 and instruction processing of the printing (including two-sided printing) of an electronic document by the print job generation section 143; a document-processing allowance/rejection controller 145 which, in cooperation with the policy management device 40, receives, for example, a request for processing of an electronic document (viewing, printing, etc.) from a user, inquires of the policy management device 40 for authorization concerning the document processing of that electronic document by the user on the basis of a document identifier (document ID) of that electronic document and a user ID of that user, acquires the authorization, and effects document-processing allowance/rejection control as to whether that document processing is to be executed or prohibited on the basis of the acquired authorization; and a user authentication controller 146 for effecting control of user authentication in cooperation with a user authentication controller 244 of the document management device 20 by acquiring the user ID from the user prior to such as the operation with respect to the electronic document.

At the time of registration of an electronic document in the document management device 20, the document-attribute-information generation section 144 generates, as the document attribute information, registered document attribute information including a document ID for identifying the document.

In addition, when an electronic document is generated or acquired and two-sided print is instructed to the image formation device 30, the document-attribute-information generation section 144 generates information including, among others, a document ID for identifying an electronic document subject to printing; a page identification information (page ID) for identifying each page of that electronic document; a logical page number of each page (hereafter, page number); a total number of pages; a two-sided print identifier (refer to a first example) indicating that two-sided printing has been executed; a rear-side mark presence identifier (refer to a second example) indicating that a print image is present or absent on the rear side, and a page ID (predetermined value) for printing on an added page next to a final page in a case where the total number of pages is an odd number.

As the page ID (excluding the page ID corresponding to the aforementioned added page), for example, a hash value is calculated on the basis of the electronic document data of each page of the electronic document subject to printing, and that hash value is used as the page ID of the relevant page.

At the time of the aforementioned two-sided print instruction, the print job generation section 143 generates a rendering command (two-sided print job) whereby information, such as the document ID and the page ID, generated by the document-attribute-information generation section 144 is synthesized with the image of the document data of each page as an added image and can be subjected to two-sided printing, and the print job generation section 143 sends the two-sided print job to the designated image formation device 30.

Figure 3:
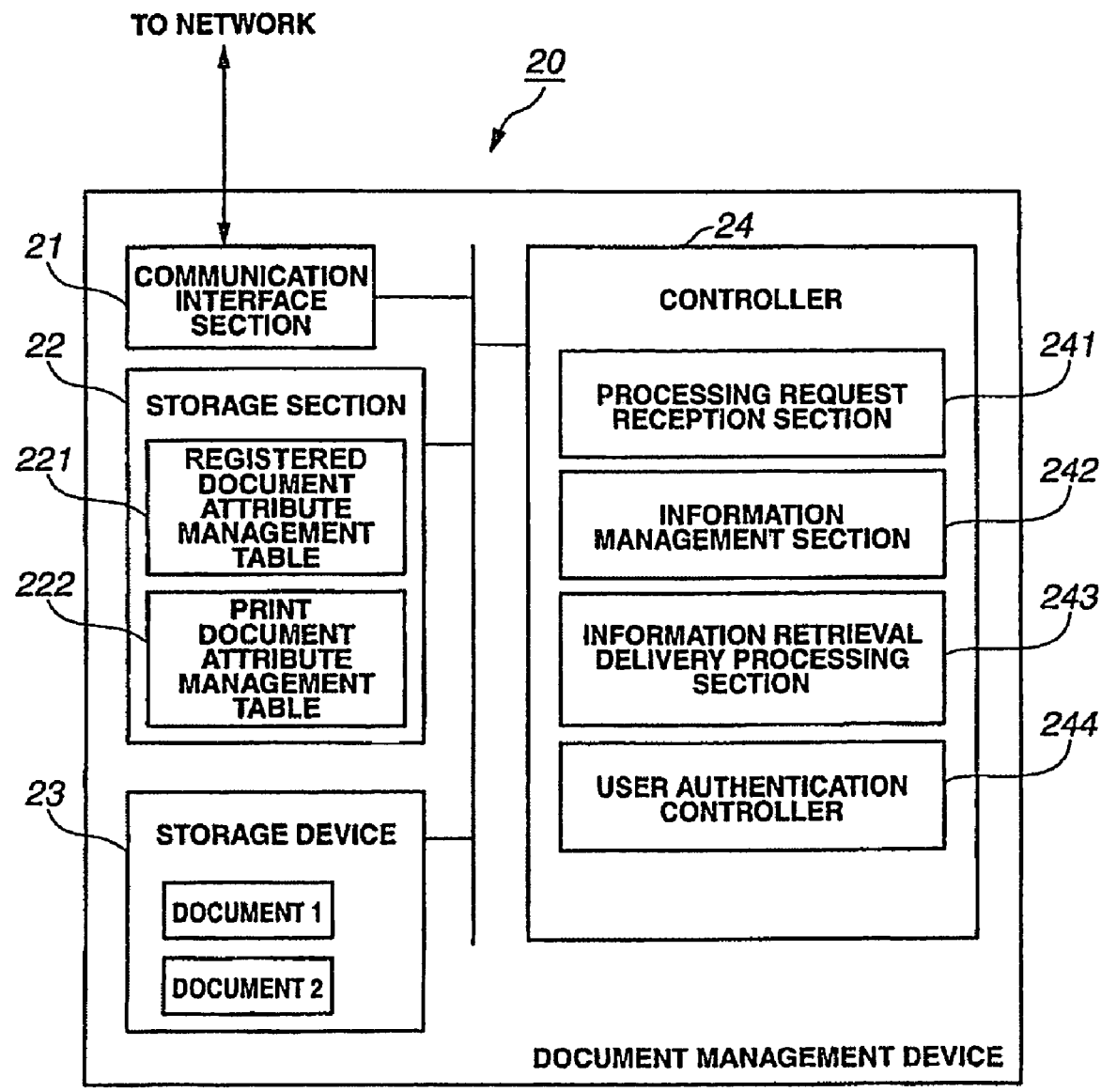
FIG. 3 is a block diagram illustrating a functional configuration of a document management device shown in FIG. 1.

FIG. 3 is a block diagram illustrating a functional configuration of the document management device 20 shown in FIG. 1.

The document management device 20 is constituted by a general-purpose computer and, as shown in FIG. 3, it is configured by including a communication interface (I/F) section 21 acting as a communication interface at the time of communication with the client terminal 10, the image formation device 30, and the like via the NW 60; a storage section 22 for storing various information such as an operation program; a storage device 23 constituted by, for example, a hard disk drive (HDD) and for storing information of such as the electronic document in which the registration request was made from the client terminal 10; and a controller 24 for effecting control of the overall device.

The controller 24 includes a processing request reception section 241, an information management section 242, an information retrieval delivery processing section 243, and the user authentication controller 244.

The processing request reception section 241 receives a request for registration or acquisition of various information from the client terminal 10 or the image formation device 30, and instructs the execution of the requested information registration or information retrieval to the information management section 242 or the information retrieval delivery processing section 243.

The information management section 242 registers the requested information in the storage section 22 or the storage device 23 on the basis of the information registration instruction from the processing request reception section 241.

The information retrieval delivery processing section 243 effects processing in which it retrieves information, for which an acquisition request has been made, from the storage section 22 or the storage-device 23, and delivers the information to the device which made the request.

The user authentication controller 244 receives a user authentication request, including the user ID, from the client terminal 10 or the image formation device 30, and effects control of user authentication for determining whether or not the user corresponding to that user ID is an authorized user.

The storage section 22 is provided with a registered document attribute management table (TB) 221 (see FIG. 7) for managing the attribute information of the registered document when the client terminal 10 registered a document in the document management device 20, as well as a print document attribute management table 222 (see FIG. 11) for managing the attribute information of a document to be printed when the client terminal 10 instructs printing (including two-sided printing) to the image formation device 30 to print the image of the electronic document on a recording sheet (hereafter, the output paper with the image of the electronic document and the like printed thereon will be referred to as the paper document).

Figure 4:
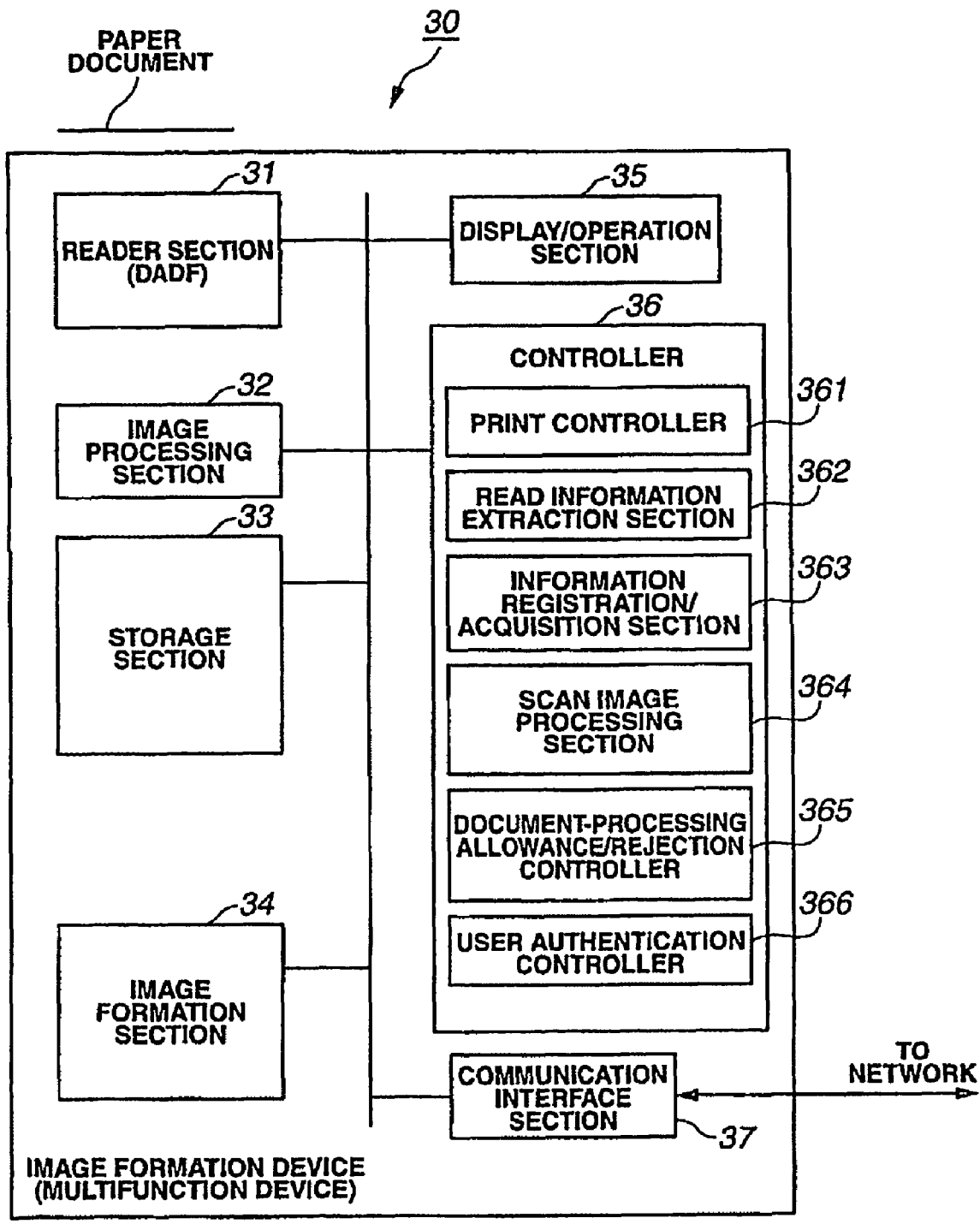
FIG. 4 is a block diagram illustrating a functional configuration of an image formation device shown in FIG. 1.

FIG. 4 is a block diagram illustrating a functional configuration of the image formation device 30 shown in FIG. 1.

This image formation device 30 is, for example, a multi-function printer having a plurality of functions including document reading (scanning), copying, printing, facsimile (FAX) communication, and the like. As shown in FIG. 4, the image formation device 30 is configured by including a reader section 31 for scanning an image of an original (paper document) set on a platen and converting it into an electrical image signal (image data); an image processing section 32 for effecting image processing for generating print data from scan data obtained by scanning the paper document by the reader section 31 or from the print job sent from the client terminal 10; an image formation section 34 for forming an image corresponding to the print data on a recording medium (recording sheet) by executing electrophotographic process on the basis of the print data generated by the image processing section 32; a display/operation section 35 constituted by a large-size bit-map display or the like having a touch panel function; a controller 36 for effecting control of the overall device such as control of the operation of the respective pertinent sections respectively relating to the functions of scanning, copying, printing, FAX, and the like; and a communication interface (I/F) section 37 acting as a communication interface at the time of communication with the client terminal 10, the policy management device 40, and the like via the NW 60.

The reader section 31 is a sheet feeder type scanner and particularly has an automatic document feeder (DADF).

The reader section 31 in which the DADF is adopted has a function in which, for instance, after the paper document is transported from a set position to a predetermined reading position on the platen and an image on one side (front side) of the paper document is read and scanned, the paper document is further transported and is inverted, and is subsequently sent back again to the reading position to read scan (two-sided read scan) the other side (rear side) of the paper document.

The controller 36 is provided with a print controller 361 for effecting print control whereby print data is generated by the image processing section 32 on the basis of the print job received from the client terminal 10 through the communication I/F section 37 or the scan data obtained by scanning a paper document by the reader section 31, and an image based on that print data is formed (printed) and outputted on the recording sheet by the image formation section 34.

In particular, the print controller 361 has a two-sided print controlling function whereby in the case where the aforementioned two-sided print job has been received from the client terminal 10, the print controller 361 controls the image processing section 32 and the image formation section 34 to print out two-sided printed paper documents in which an electronic document subject to printing is formed on both sides of each relevant recording sheet in a state in which an image of the document data on each of the pages as well as an image of added information such as the document ID and a page ID of each page are synthesized on each page.

In addition; the controller 36 is provided with a read information extraction section 362, an information registration/acquisition section 363, a scan image processing section 364, a document-processing allowance/rejection controller 365, and a user authentication controller 366.

The read information extraction section 362 effects the processing of extracting added information such as the page ID from the scan data obtained by scanning the image on the paper document with the page ID imparted thereto by the reader section 31.

The information registration/acquisition section 363 effects information registration processing in which, in a case where the scan or copy operation of a paper document is performed, document attribute information, containing the document ID and the like for identifying that it is a document derived from the operation, is generated, and the document attribute information is registered together with meta information concerning the operation, as well as information acquisition processing in which the document ID corresponding to the page ID extracted by the aforementioned read information extraction section 362 is acquired from the document management device 20.

With respect to the image data read by the reader section 31, the scan image processing section 364 effects image processing (generation of scan-in data and generation of data for copying) in correspondence with the details of a read start operation (scan, copy, etc.).

In cooperation with the policy management device 40, the document-processing allowance/rejection controller 365 effects document-processing allowance/rejection control in which, for instance, by using as keys the document ID extracted from the scan data obtained by scanning two-sided images of a two-sided printed paper document in the reader section 31 and the user ID of the user who performed that scan operation, the document-processing allowance/rejection controller 365 inquires of the policy management device 40 for authority concerning the document processing (scan, copy, etc.) of scan data by the user, acquires the authority, and executes or prohibits that document processing (scan, copy, etc.) on the basis of the acquired authority.

The user authentication controller 366 effects control of user authentication in cooperation with the user authentication controller 244 in the document management device 20 by acquiring the user ID from the user prior to the use of scan or the like of the paper documents.

Figure 5:
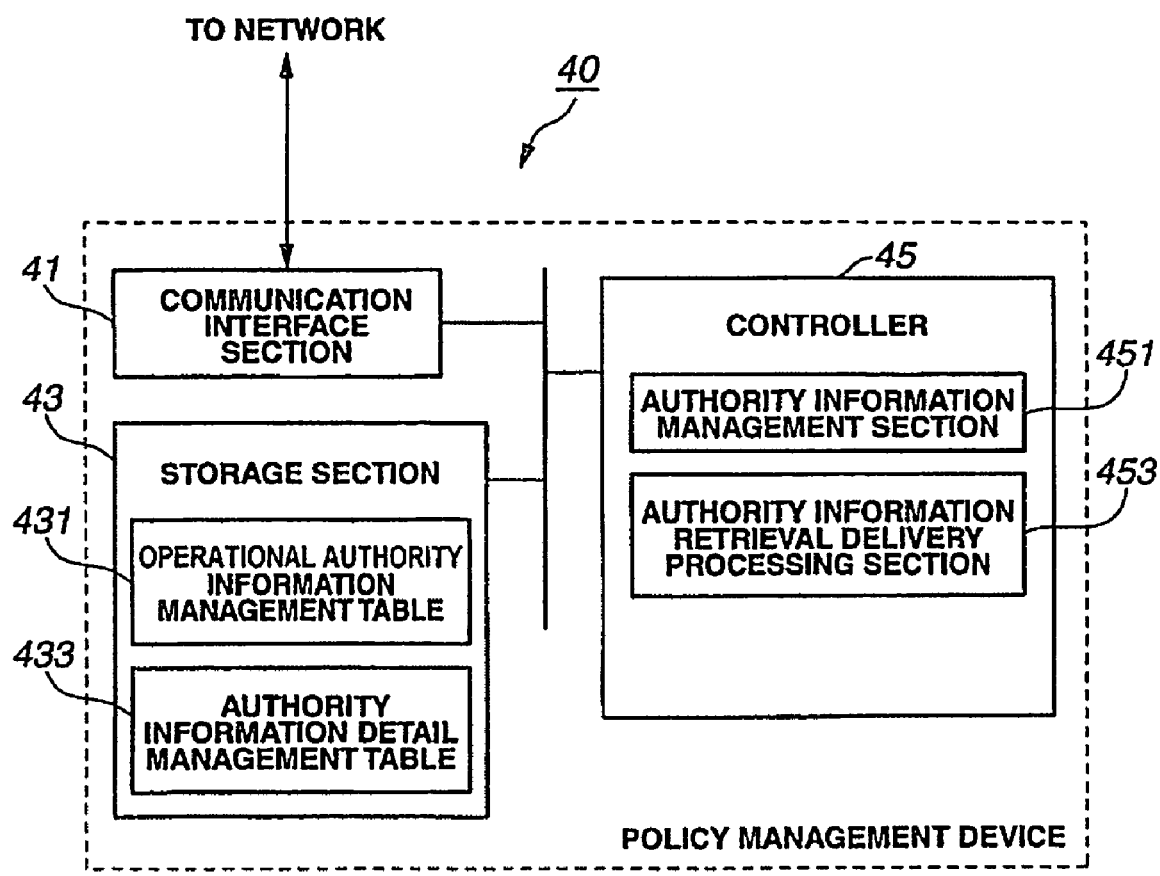
FIG. 5 is a block diagram illustrating a functional configuration of a policy management device shown in FIG. 1.

FIG. 5 is a block diagram illustrating a functional configuration of the policy management device 40 shown in FIG. 1.

The policy management device 40 is constituted by a general-purpose computer, and is configured by including a communication interface (I/F) section 41 acting as a communication interface at the time of communication with the client terminal 10, the image formation device 30, and the like via the NW 60; a storage section 43 for storing various information such as the operation program; and a controller 45 for effecting control of the overall device, as shown in FIG. 5.

In the policy management device 40, the storage section 43 is provided with an operational authority information management table (TB) 431 and an authority information detail management table (TB) 433.

Document operational authority information such as the one shown in FIG. 8 is held in the operational authority information management table 431.

Authority detailed information in which security levels a, b, and c (e.g., general employees, managers, officers, etc.) held in the operational authority information management table 431 and user IDs are made to correspond to each other is held in the authority information detail management table 433.

The controller 45 is provided with an authority information management section 451 and an authority information retrieval delivery processing section 453.

The authority information management section 451 effects the processing of registering the aforementioned document operational authority information and authority information detailed information in the operational authority information management table 431 and the authority information detail management table 433 respectively corresponding thereto, as well as management of the information.

According to the information structure of the document-authority information and the authority information detailed information in the operational authority information management table 431 and the authority information detail management table 433, the authority information management section 451 manages authority over the operation (scan, copy, etc.) of the paper document on which the electronic document is printed in correspondence with the document ID at security levels [user level (user ID)] by using those management tables 431 and 433.

In cooperation with, for example, the document-processing allowance/rejection controller 145 (see FIG. 2) of the client terminal 10 and the document-processing allowance/rejection controller 365 (see FIG. 4) of the image formation device 30, the authority information retrieval delivery processing section 453 effects control in which it receives an authority inquiry request containing the document ID and the user ID from these devices, and delivers to the inquirer device the authority concerning the document processing ("view," "print," "scan," "copy," etc.) of a document corresponding to the document ID and the user ID contained in that authority inquiry request.

To execute this control, the client terminal 10 and the image formation device 30 respectively have user authentication functions (user authentication controllers 146 and 366) whereby the user ID is acquired from the user, an inquiry is made to, for example, the policy management device 40 on the basis of that user ID as to whether or not the user is an authentic user, and the result of authentication is acquired.

As a result, for example, when the operation of viewing or printing of an electronic document is performed by the client terminal 10 after the aforementioned user authentication, or when the two-sided scanning or two-sided copying of a two-sided printed paper document is performed by the image formation device 30 after the aforementioned user authentication, if an authority acquisition request containing the user ID obtained by the user authentication and the content of the operation is sent from each of these devices, the authority information retrieval delivery processing section 453 obtains a security level corresponding to the user ID contained in that authority acquisition request from the authority information detail management table 433. Then, a determination as to whether or not authority is present (whether or not a flag is "1") is made in correspondence with the security level obtained and the content of operation contained in the received request, and its result (authority is present, or authority is absent) is responded and sent to the inquirer device.

In the system of the present invention in which the above-described devices are network-connected, when an operation of instructing two-sided printing of an electronic document is made by the user, as for the client terminal 10, the document-attribute-information generation section 144 generates information such as the document ID of that electronic document and the page ID of each page, and the print job generation section 143 generates a two-sided print job which instructs the rendering for each page of an image of the document data of that page together with an image containing the aforementioned document ID and the page ID, and sends it to the image formation device 30.

Meanwhile, in the image formation device 30, upon receiving the aforementioned two-sided print job from the client terminal 10, the print controller 361 analyzes the rendering command from the two-sided print job, instructing the "rendering on both sides the document data of each page of the electronic document by imparting thereto such as the page ID corresponding to each page and the document ID." Further, the print controller 361 controls the image formation section 34 to duplex print the print-instructed electronic document on each recording sheet corresponding to the respective page by imparting to each page the added information such as the document ID of the relevant electronic document and the page ID identifying each page, and to output it as a paper document.

Through this two-sided print control, a two-sided printed paper document (see FIG. 10) is obtained in which an image of the document data of each page and images of such as the document ID and the page ID are formed together on both sides of the recording sheet for each page of the electronic document.

Here, for example, in a case where an electronic document whose total number of pages is an odd number is subjected to two-sided printing, after a final page is printed on the front side of the corresponding recording sheet of paper, there is no more page subject to printing, so that nothing is printed on the rear side of that recording sheet. Hence, that two-sided printed paper document is outputted such that an image is printed on one side but the other side is in a blank state.

Incidentally, in this system, the user performs two-sided scanning of the two-sided printed paper documents, which is obtained in the above-described two-sided printing, by the image formation device 30, thereby storing the scan data or performing two-sided copying.

As the processing operation of this scan-in and two-sided copying, in the image formation device 30, the paper documents which is subjected to two-sided printing with the information of such as the document ID and the page ID added thereto by the above-described two-sided print control are set in the DADF constituting the reader section 31, and the operation of two-sided scan start is effected. Then, in the reader section 31, after the two-sided printed paper document is transported from a set position to a predetermined reading position on the platen and an image on one side (front side) of the two-sided printed paper document is read and scanned, the two-sided printed paper document is further transported and is inverted, and is subsequently sent back again to the reading position to read scan the other side (rear side) of the two-sided printed paper document, thereby obtaining two-sided scan data of that two-sided printed paper document.

Here, in a case where the two-sided printed paper document is a final one (one side is in a blank state) of paper documents obtained by subjecting an electronic document whose total number of pages is an odd number to two-sided printing, among two-sided scan data obtained by subjecting the final one of the two-sided printed paper documents to two-sided scanning, the page ID can be extracted from the page printed on the front side, but the page ID cannot be extracted from the scan data of the page corresponding to its rear side since the scan data is that of a blank page. If no measure is taken, the operation would be stopped just as in the case where the page ID cannot be read due to the staining or concealment of an image formation area including the page ID.

In the present invention, even in such a case (the case where the page ID could not be extracted from the scan data of a certain page among two-sided scan data obtained by the two-sided scanning of two-sided printed paper documents), if it is the case in which the page ID of that page cannot be extracted because that page is the rear side (in a blank state) of a paper document obtained by subjecting document data a final page to two-sided printing in the two-sided printing of an electronic document having an odd number of pages, this can be recognized and the processing of scan data of subsequent pages can be continued. Thus, smooth processing of scan data can be realized by distinguishing the case from those cases in which the page ID cannot be extracted due to the staining or the like despite the fact that the page ID is imparted.

Figure 13:
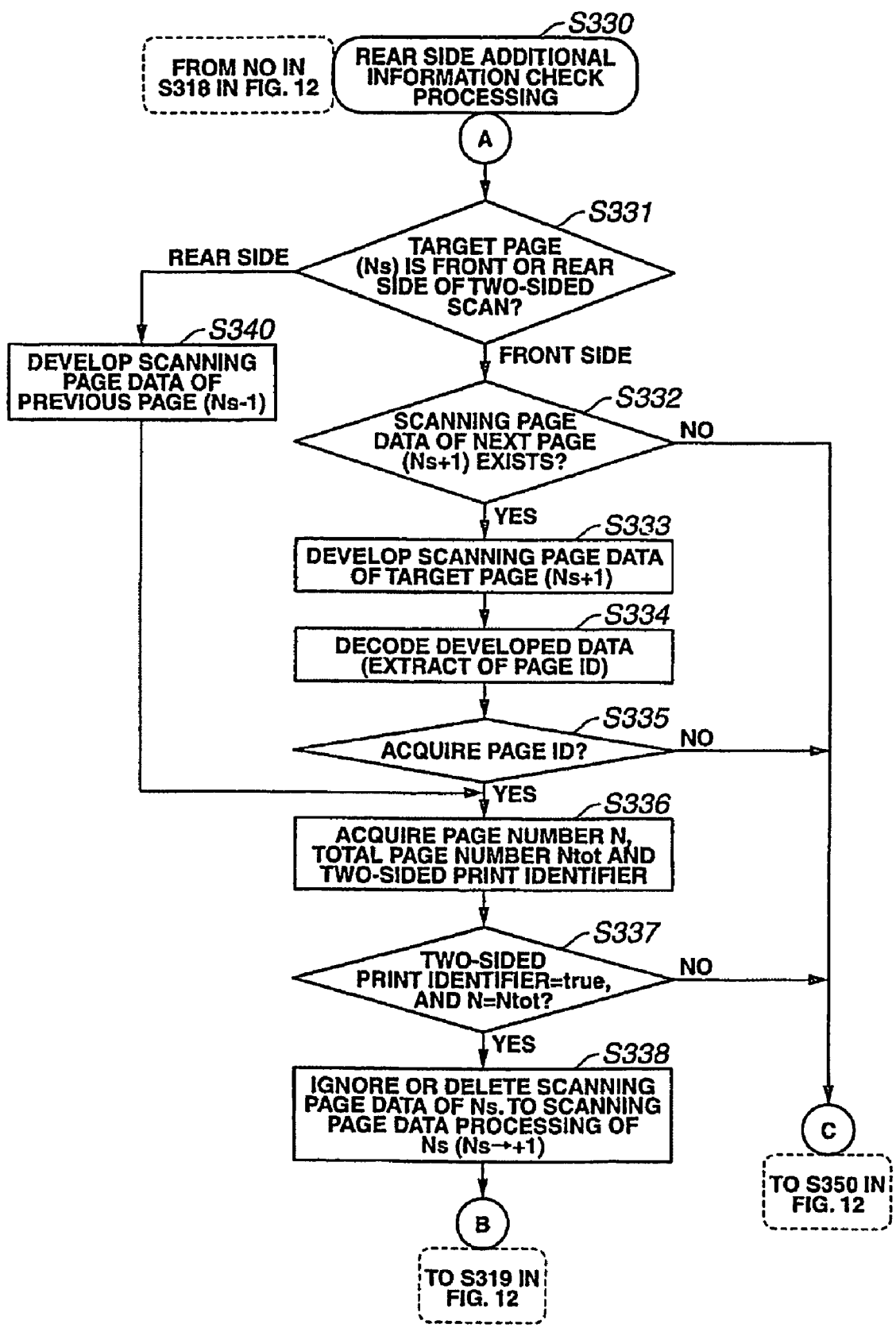
FIG. 13 is a flowchart illustrating check processing of added information on the rear side following NO in S318 in FIG. 12.
Figure 19:
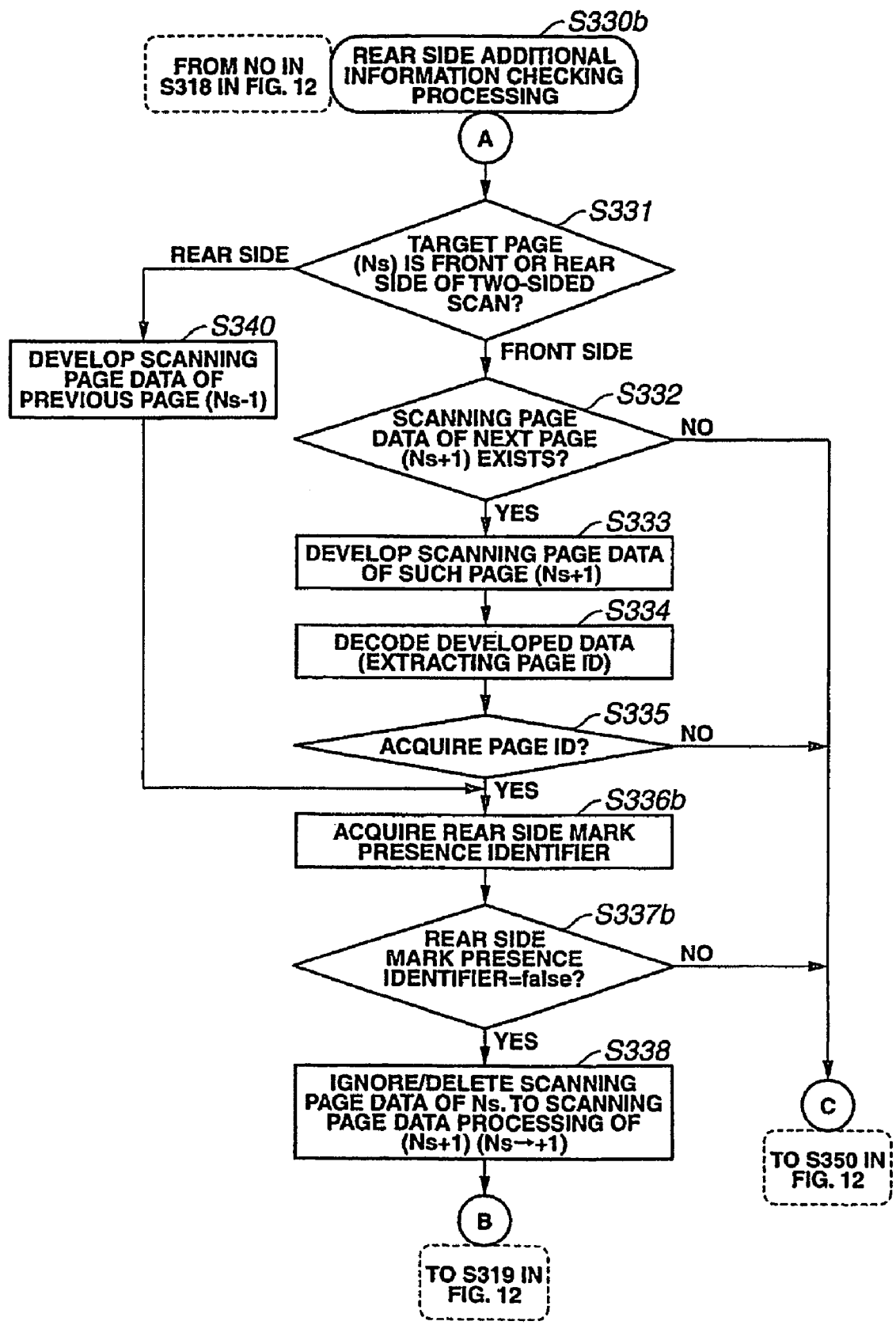
FIG. 19 is a flowchart illustrating check processing of added information on the rear side during the two-sided scan processing of the paper document in the second example.

To realize this, in the image formation device 30, the scan image processing section 364 has a processing function (the function of check processing of added information on the rear side, shown in FIGS. 13 and 19) whereby, when the page ID could not be extracted in the process of extracting the page ID by fetching the scan data of one page at a time from the two-sided scan data, the scan image processing section 364 determines whether or not it is appropriate to skip the relevant page since it is a page on which no image was printed from the outset at the time of two-sided printing, and if it is determined that it is appropriate to skip it, the processing of scan data of the other pages is continued by ignoring the page for which the page ID could not be extracted.

Hereinafter, a detailed description will be given of the processing operation in the system of the present invention by citing first to third examples.

First Example

As for the system in accordance with the first example, in the system configuration shown in FIG. 1, the client terminal 10, the document management device 20, the image formation device 30, and the policy management device 40 are configured by having functional blocks shown in FIGS. 2 to 5, respectively.

In the client terminal 10 (see FIG. 2), the document-attribute-information generation section 144 has the function of generating the information of the document ID, the total number of pages, the page ID of each page, the page number, and the two-sided print identifier [having a value (true) indicating that two-sided printing has been executed or a value (false) indicating that two-sided printing has not been executed] as information (added data) to be imparted to each page on the basis of the electronic document data subject to printing at the time of two-sided printing. Meanwhile, the application section 141 has the function of generating a print job in which electronic document data, the two-sided printing of which is instructed, can be subjected to two-sided printing for each page on each printing surface corresponding to the page number of each page by adding thereto the aforementioned added data.

In addition, in the image formation device 30, the print controller 361 has the function of two-sided printing control whereby, on the basis of the two-sided print instruction (the aforementioned print job) of the electronic document from the client terminal 10, the electronic document is subjected to two-sided printing for each page on each printing surface corresponding to the page number of each page by adding thereto the document ID, the total number of pages, the page ID of each page, the page number, and the two-sided print identifier. Meanwhile, the scan image processing section 364 has a processing function whereby the scan data of pages Ns subject to page ID extraction is consecutively fetched to extract the page ID from the scan data of all pages obtained by the two-sided scanning of the two-sided printed paper documents effected by the reader section 31 on the basis of the two-sided scan operation by the user with respect to paper documents subjected to two-sided printing by the aforementioned two-sided printing control function. In this processing function, if it was not possible to extract the page ID from Ns-th scan data, the page ID is extracted on the basis of the respective information of the page ID, the page number N, the total number of pages Ntot, and the two-sided print identifier extracted from the scan data of an (Ns−1)-th page (immediately preceding page) or an (Ns+1)-th page (next page), and if the extracted two-sided print identifier indicates that two-sided printing has been executed and if the extracted page number N is equal to the extracted total number of pages Ntot, it is determined that the page Ns for which the page ID cannot be extracted is a page to be appropriately deleted [a page corresponding to the rear side (rear side of a final printed sheet) of a paper document obtained by subjecting a final page of an electronic document having an odd number of pages to two-sided printing].

A description will be given, in order, of the document registration processing, document two-sided printing, and two-sided scan processing of the system in accordance with the above-described example.

Figure 6:
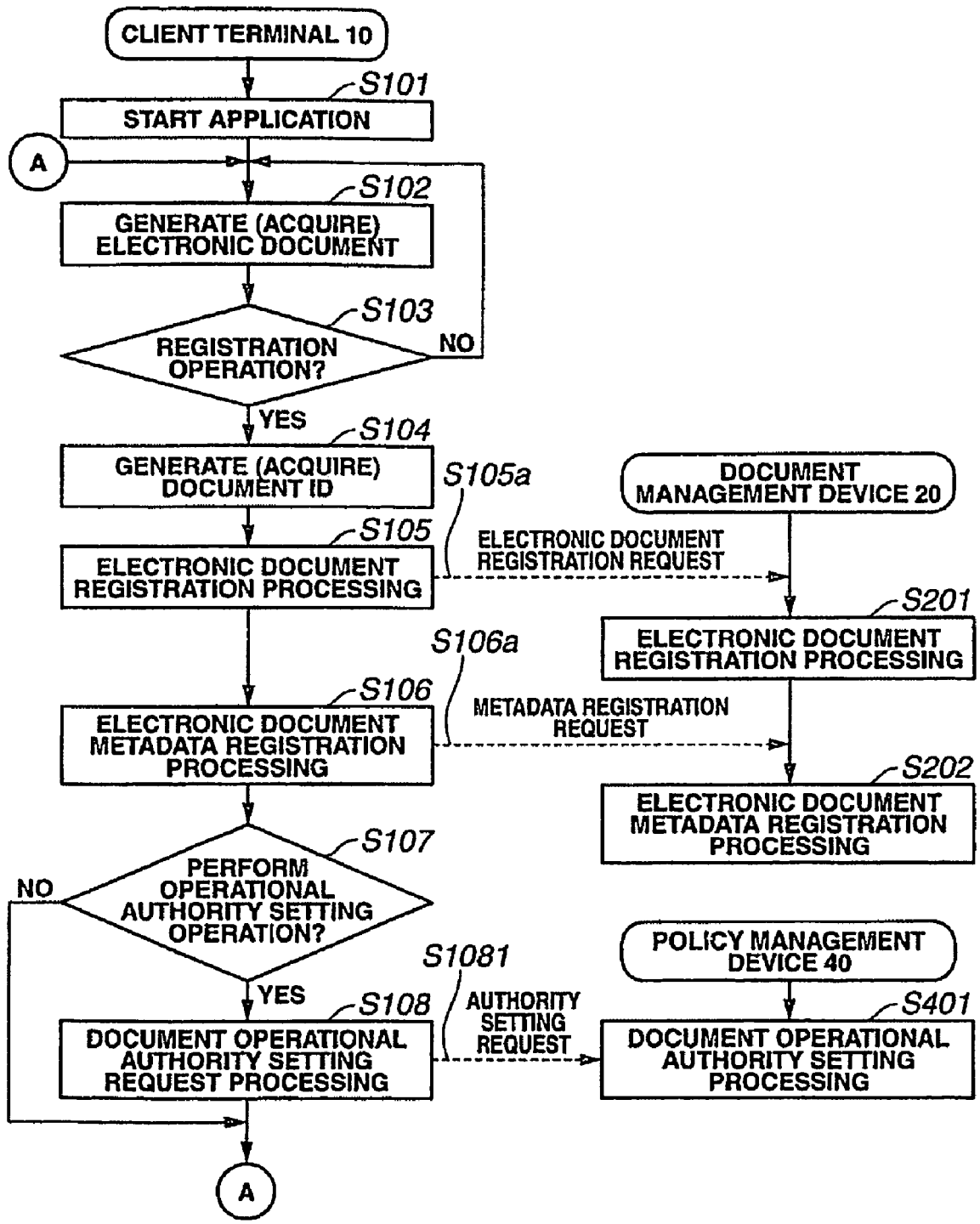
FIG. 6 is a diagram illustrating a control sequence related to document registration processing in a first example.

FIG. 6 is a diagram illustrating a control sequence between the client terminal 10 and the document management device 20 which are related to document registration processing by the system of this example.

At the time of document registration processing shown in FIG. 6, the client terminal 10 starts an application (document processing application) by instructing the application section 141 on the basis of predetermined user operation at the input/operation section 11 (Step S101), displays an edit screen to receive input of information, and generates electronic document data on the basis of the input information (Step S102).

During the processing of electronic document data generation in Step S102, the document-attribute-information generation section 144 monitors whether or not document registration operation is performed in the input/operation section 11 by the user (Step S103). If the registration operation has been performed (YES in Step S103), the document-attribute-information generation section 144 generates a document ID for identifying that electronic document data by such as a method in which the user is made to enter a desired document ID by using a registration setting screen, for example (Step S104).

It should be noted that, in the aforementioned Step S102, the processing of acquiring electronic document data registered in advance in the document management device 20 and the like may also be allowed, and if electronic document data is acquired from a registration destination, in Step S104, the document ID of that electronic document data may be acquired from that registration destination.

Next, the information registration/acquisition section 142 consecutively carries out processing (Step S105) for registering the electronic document data generated (or acquired) in Step S102, as well as processing (Step S106) for registering various data (meta data concerning the registration of that electronic document data) including the document ID generated (or acquired) in Step S104.

At the time of the registration processing of the electronic document data in Step S105, the information registration/acquisition section 142 sends a registration request containing the electronic document data to the document management device 20 (Step S105a).

Meanwhile, in the document management device 20, when the aforementioned electronic document registration request sent by the client terminal 10 is received by the processing request reception section 241, the information management section 242 stores the electronic document data contained in that registration request in a predetermined storage site of the storage device 23, for example (Step S201: electronic document registration processing).

In addition, at the time of the registration processing of the electronic document meta data in Step S106, the information registration/acquisition section 142 sends to the document management device 20 a registration request containing various meta data concerning the document ID and the document registration, which is generated by the document-attribute-information generation section 144 at the time of the generation of that electronic document data (Step S106a).

On the other hand, in the document management device 20, when the aforementioned electronic document meta data registration request sent by the client terminal 10 is received by the processing request reception section 241, the information management section 242 causes the document ID contained in that registration request and the storage site of the electronic document data in the aforementioned Step S201 to correspond to each other, and stores that document ID in, for example, the registered document attribute management table 221 of the storage section 22 (Step S202: electronic document meta data registration processing).

Figure 7:
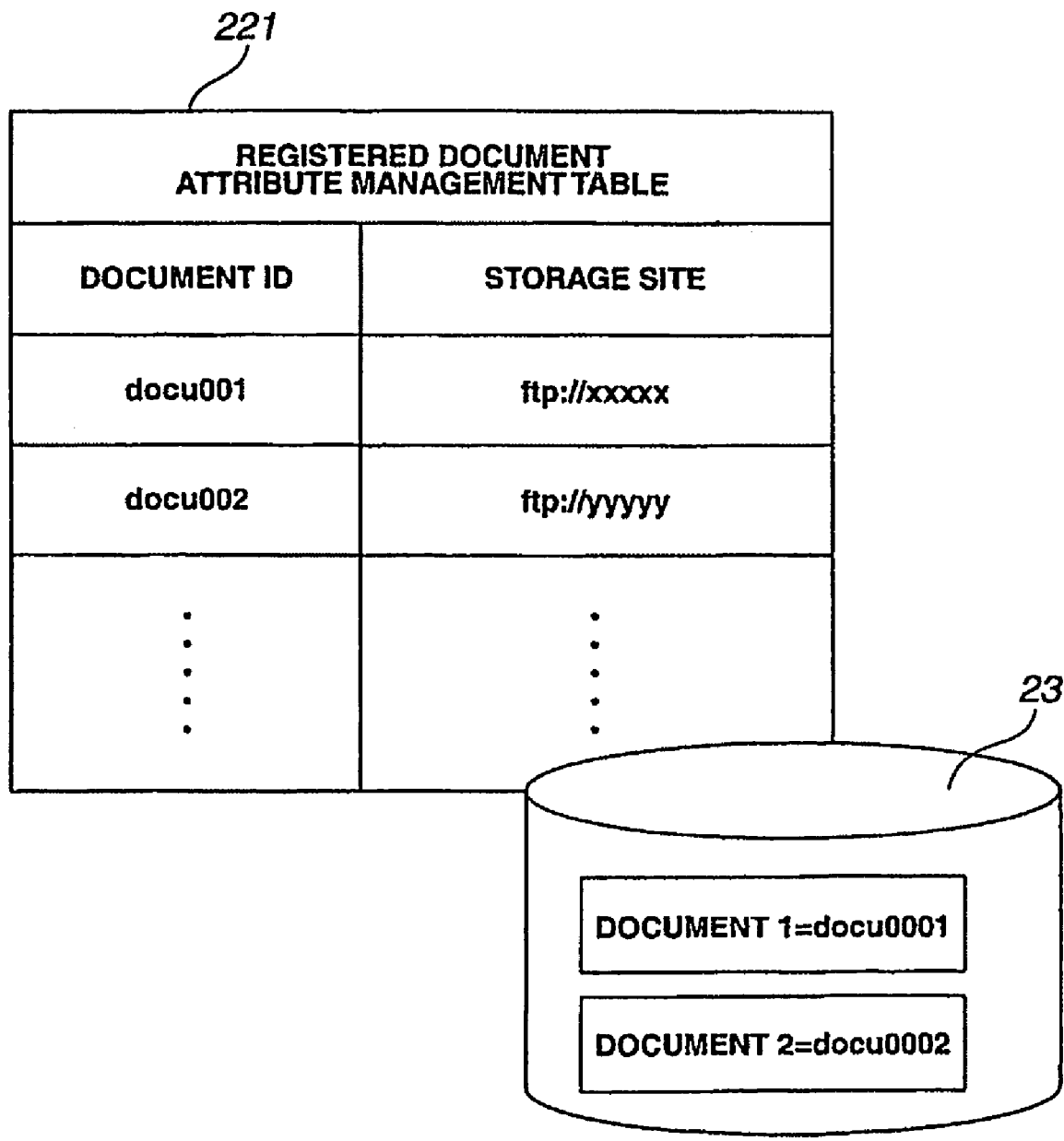
FIG. 7 is a conceptual diagram illustrating an example of information registered in a registered document attribute management table.

FIG. 7 is a diagram illustrating the example of the information which is registered in the registered document attribute management table 221 of the document management device 20.

In the registered document attribute management table 221 of this example, the document ID (=docu1) of a document 1 stored in the storage device 23 and the storage site (=ftp://xxxxx) of that document 1 in the storage device 23, as well as the document ID (=docu2) of a document 2 stored in the storage device 23 and the storage site (=ftp://yyyyy) of that document 2 in the storage device 23, are stored by being respectively made to correspond to each other.

It should be noted that, the example of FIG. 7 only demonstrates that only the storage site of the electronic document data having the document ID is registered in the registered document attribute management table 221 in correspondence with the document ID. However, meta data such as a preparer of that electronic document data, the date of preparation, etc. may also be stored together.

In addition, at the time of registration of the document data and document meta data in the aforementioned Steps S105 and S106, the client terminal 10 also carries out the registration setting processing of operational authority concerning that registered document data.

This operational authority setting processing may be carried out as follows: For example, after completion of the registration processing of the document data and document meta data in the aforementioned Steps S105 and S106, whether or not there is an operational authority setting request is monitored (Step S107), and if there is a setting request (YES in Step S107), the authority setting request containing the setting content information inputted by the user is sent to the policy management device 40 (Step S1081). Upon receiving that document authority setting request, the authority information management section 451 of the policy management device 40 effects the processing of setting the setting contents in the operational authority information management table 431 (Step S401).

Consequently, at the time of the operational authority registration processing of the electronic documents 1 and 2, for example, the document operational authority information as shown in FIG. 8 is set in the operational authority information management table 431.

According to this example, concerning the electronic document 1 (and the electronic document 2), the presence or absence of operational authority (authority is present=flag "1" is present, authority is absent=flag "1" is absent) concerning the operation of various types, including viewing, printing, scanning, copying, and the like is registered and set in correspondence with the document ID (=docu001) [the same applies to the document ID (=docu002)] of the electronic document 1 (the same applies to the electronic document 2) and in association with the user's attribute [a security level determined in correspondence with a post and the like [e.g., level a (level: high): department manager's post or higher; level b (level: middle level: section chief's post or higher; and level c (level: low): regular employees)]].

Figure 9:
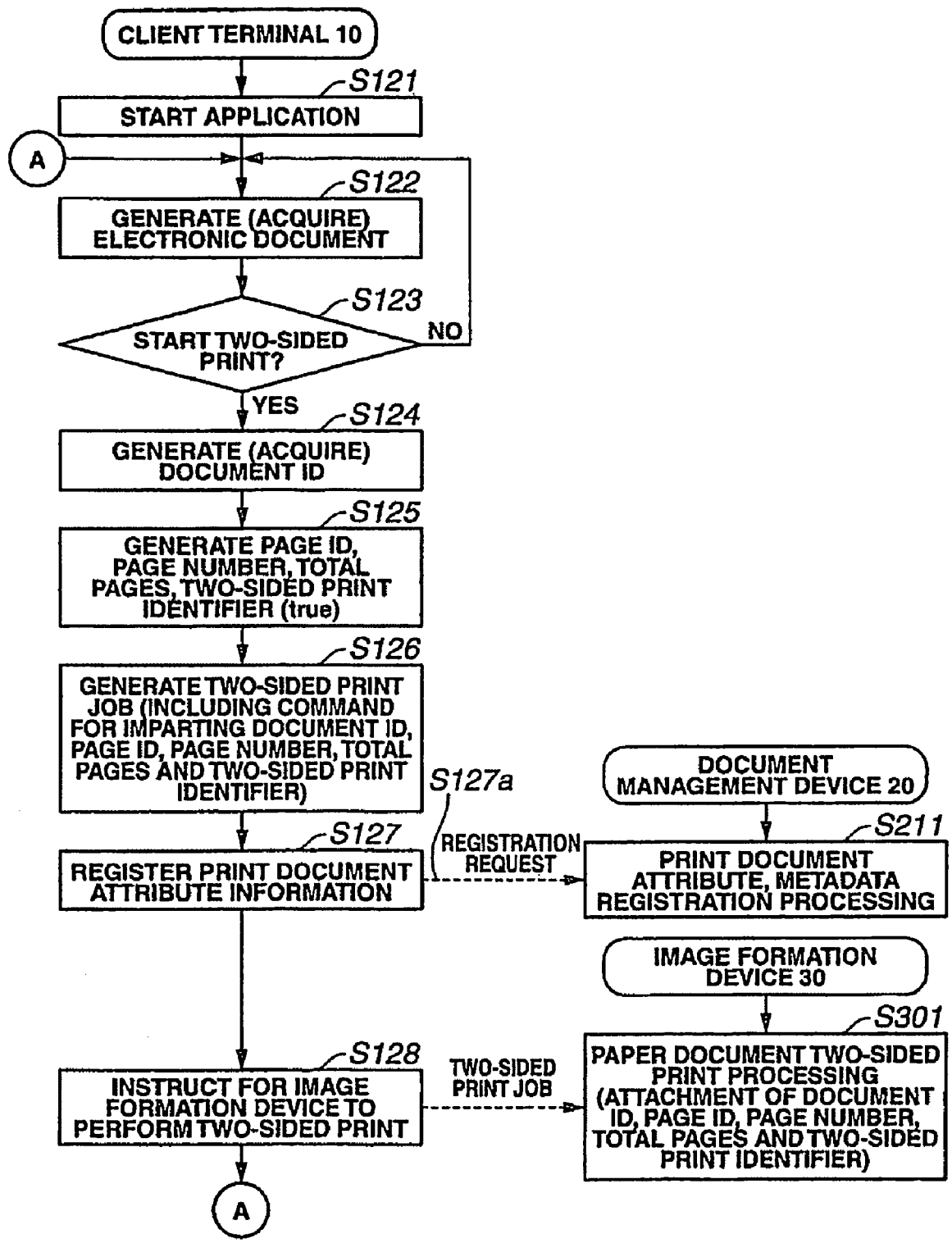
FIG. 9 is a diagram illustrating a control sequence related to two-sided print processing of an electronic document in the first example.

FIG. 9 is a diagram illustrating a control sequence among the client terminal 10, the document management device 20, and the image formation device 30 which are related to the two-sided print processing of electronic documents in the system of this example.

At the time of two-sided print processing shown in FIG. 9, the client terminal 10 starts an application by similar processing to that of, for example, Step S101 in FIG. 6 (Step S121), and generates or acquires electronic document data by similar processing to that of Step S102 in FIG. 6 (Step S122).

During this processing of electronic document data generation, the document-attribute-information generation section 144 monitors whether or not two-sided printing start operation is performed by the user by using the input/operation section 11 (Step S123). If the two-sided printing start operation is performed (YES in Step S123), the document-attribute-information generation section 144 generates a document ID for identifying that electronic document (electronic document subject to printing) (Step S124).

The document ID of the electronic document subject to printing can be generated by processing similar to that of Step S104 in FIG. 6, and in a case where the electronic document data is acquired from the registration destination, its document ID can also be acquired.

Subsequently, the document-attribute-information generation section 144 analyzes the electronic document data subject to printing, and generates the respective information of the page ID of each page of that electronic document data, the page number of each page, the total number of pages of that electronic document, and the two-sided print identifier (=true) indicating that two-sided printing is executed (Step S125).

Next, the print job generation section 143 generates a two-sided print job from the electronic document data generated (or acquired) in the aforementioned Step S122 and from respective information of the document ID, the page ID, the page number, the total number of pages, and the two-sided print identifier generated in the aforementioned Steps S124 and S125 (Step S126).

Here, the print job generation section 143 generates a print job in which a rendering command is described to render on both sides the electronic document data of each page subject to printing by imparting to each page a document ID and the total number of pages which are common to each page, the page ID corresponding to each page, the page number, and the two-sided print identifier, more specifically a command to render on both sides a two-dimensional barcode in which the electronic document data, as well as respective values of the page ID having a hash value calculated on the basis of the electronic document data of that page, the page number, the total number of pages, and the two-sided print identifier, are held for each page individually identifiably (machine readably).

After the above-described print job is generated, the information registration/acquisition section 142 executes processing (Step S127) for registering the document ID of the electronic document subject to printing and generated (or acquired) in Step S124, as well as the respective information of the page ID and the page number of each page, the total number of pages, and the two-sided print identifier generated in Step S125 in a respectively corresponding manner.

At the time of this registration processing of print document attribute information, the information registration/acquisition section 142 sends to the document management device 20 a registration request containing the respective information of the document ID of the aforementioned electronic document subject to printing, the page number and the page ID of that electronic document subject to printing, the total number of pages, and the two-sided, print identifier (Step S127a).

On the other hand, in the document management device 20, when the aforementioned print document attribute data registration request sent by the client terminal 10 is received by the processing request reception section 241, the information management section 242 extracts individually the respective information of the document ID, the page number and the page ID of each page, the total number of pages, and the two-sided print identifier contained in that registration request, and stores in a mutually corresponding manner the respective information in, for example, the print document attribute management table 222 of the storage section 22 (Step S211: print document attribute and meta data registration processing).

Subsequently, the print job generation section 143 effects print instruction processing in which the two-sided print job generated in the aforementioned Step S126 is sent to the image formation device 30 through the communication interface (I/F) section 15 via the NW 60 (Step S128).

On the other hand, in the image formation device 30, upon receiving through the communication interface (I/F) section 37 the aforementioned two-sided print job sent by the client terminal 10, the print controller 361 executes the two-sided print processing (Step S301) of the paper document on the basis of the two-sided print job.

In this two-sided print processing of the paper document, the print controller 361 analyzes the rendering command in the received two-sided print job, and print image data capable of rendering that electronic document data, in conjunction with the two-dimensional barcode containing each of the page ID, the page number, the total number of pages, and the two-sided print identifier, is generated for each page by the image processing section 32 in accordance with the result of that analysis. On this basis of this print image data, an image of the electronic document data of that page, as well as a two-dimensional barcode image containing on each page the page ID and the page number of that page, the total number of pages, and the two-sided print identifier, are printed out as a two-sided printed paper document formed on the front side or the rear side (each printing surface corresponding to the logical page of each page) of the recording sheet respectively corresponding to each page.

Figure 10:
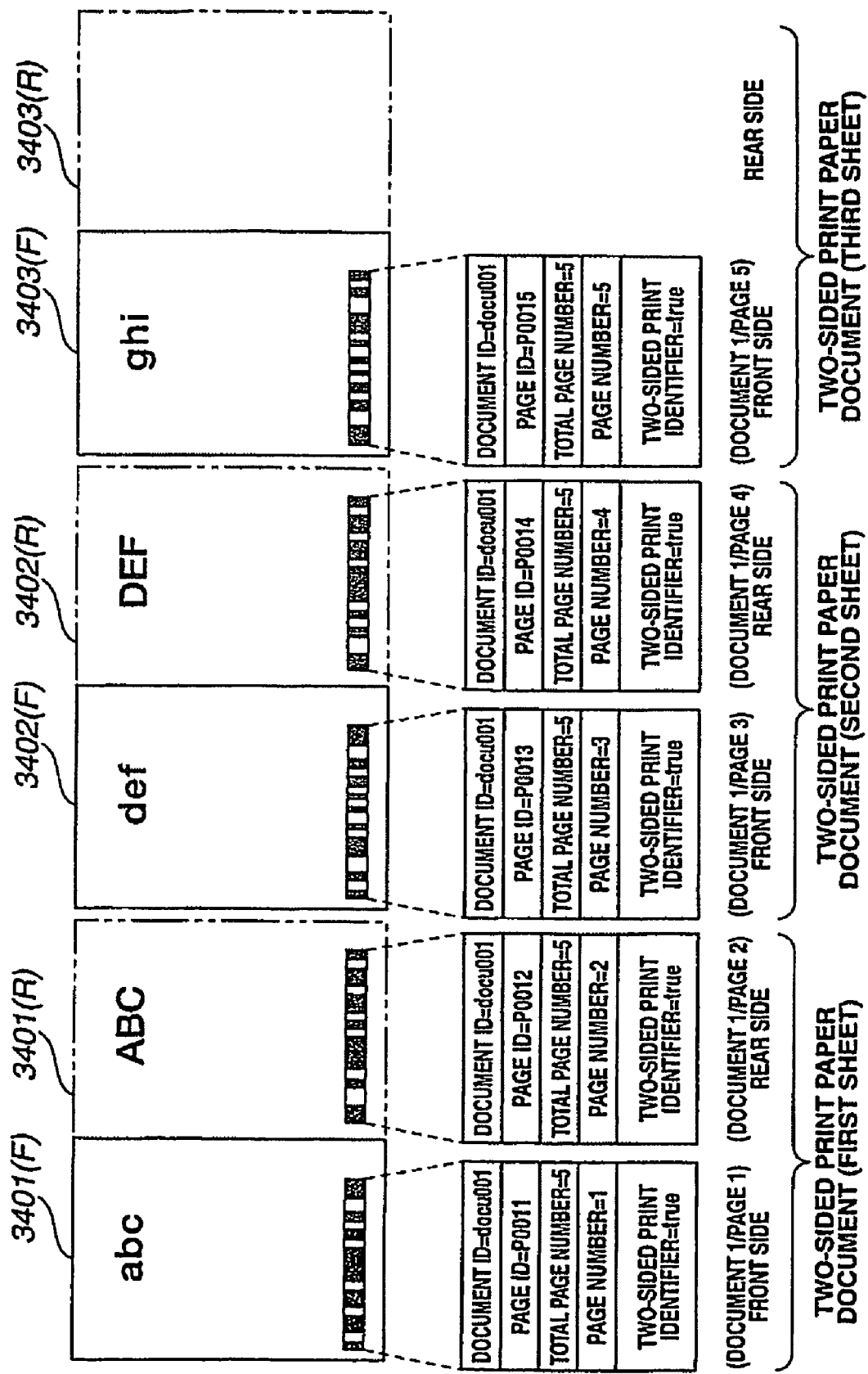
FIG. 10 is a conceptual diagram illustrating an example of a two-sided printout of paper document by the image formation device in the first example.

FIG. 10 is a conceptual diagram illustrating an example of a two-sided printout of paper documents by the image formation device 30 in Step S301 of FIG. 9.

FIG. 10 shows an example at a time when the document 1 having a document ID of "docu001" and constituted by, for example, 5-page electronic document data is subjected to two-sided printing by using three recording sheets, and is printed out as paper documents 3401, 3402, and 3403.

It should be noted that, in FIG. 10, as for the paper documents 3401, 3402, and 3403, the front side (reference character F in the drawing) is shown by a solid line, and the rear side (reference character R in the drawing) is shown by a dotted line, respectively, and the manner is conceptually (planarly) shown in which two-sided printing is effected in the order of the paper documents 3401, 3402, and 3403 from the observer's left end toward the right end in the drawing, and these paper documents are discharged.

As shown in FIG. 10, when the user instructs the two-sided printing of the document 1 from the client terminal 10, the image formation device 30, upon receiving the above-described print job based on that two-sided print instruction, first fetches a first recording sheet, and forms on its front side (F: printing surface corresponding to the first page) an image (=abc) corresponding to the electronic document data of the first page of that document 1, as well as images (in this example, these images are grouped together at one location and are formed by a two-dimensional barcode) of the respective information of the document ID (=docu001) of that document 1, the page ID (=P0011) corresponding to that first page, the total number of pages (=5), the page number (=1), and the two-sided print identifier (=true). Then, the image formation device 30 invertedly transports and fetches that first recording sheet, forms on its rear side (R: printing surface corresponding to the second page) an image (=ABC) corresponding to the electronic document data of the second page, as well as a two-dimensional barcode in which the respective information of the document ID (=docu001), the page ID (=P0012) corresponding to that second page, the total number of pages (=5), the page number (=2), and the two-sided print identifier (=true) is grouped together, and outputs the sheet as the paper document 3401 corresponding to the first two-sided printed sheet.

Next, the image formation device 30 fetches a second recording sheet, and forms on its front side (F: printing surface corresponding to the third page) an image (=def) corresponding to the electronic document data of the third page, as well as a two-dimensional barcode in which the respective information of the document ID (=docu001), the page ID (=P0013) corresponding to that third page, the total number of pages (=5), the page number (=3), and the two-sided print identifier (=true) are grouped together. Then, the image formation device 30 invertedly transports and fetches that second recording sheet, forms on its rear side (R: printing surface corresponding to the fourth page) an image (=DEF) corresponding to the electronic document data of the fourth page, as well as a two-dimensional barcode in which the respective information of the document ID (=docu001), the page ID (=P0014) corresponding to that fourth page, the total number of pages (=5), the page number (=4), and the two-sided print identifier (=true) is grouped together, and outputs the sheet as the paper document 3402 corresponding to the second two-sided printed sheet.

Further, the image formation device 30 fetches a third recording sheet, and forms on its front side (F: printing surface corresponding to the fifth page) an image (=ghi) corresponding to the electronic document data of the fifth page, as well as a two-dimensional barcode in which the respective information of the document ID (=docu001), the page ID (=P0015) corresponding to that fifth page, the total number of pages (=5), the page number (=5), and the two-sided print identifier (=true) are grouped together. Then, the image formation device 30 invertedly transports and fetches that third recording sheet, and outputs the sheet as the paper document 3403 corresponding to the third two-sided printed sheet without forming an image on the rear side (R: blank printing surface) (in the form of a blank sheet), whereupon the two-sided printing operation ends.

It should be noted that, in a case where the document 1 is outputted in two-sided printing by the image formation device 30 as the paper document with the document ID, the page ID, the page number, the total number of pages, and the two-sided print identifier imparted to each page on the basis of the two-sided print instruction from the client terminal 10, as shown in FIG. 10, in the document management device 20, the print document attribute information concerning the document 1 is held in the print document attribute management table 222 through the print document attribute and meta data registration processing in Step S211 of FIG. 9.

FIG. 11 is a table illustrating an example of information held in the print document attribute management table 222 of the document management device 20.

As shown in FIG. 11, at the time of the two-sided printing of the electronic document 1, the page IDs (P0011, P0012, P0013, P0014, and P0015) of the respective pages 1 to 5 of that document 1 and the page numbers (1, 2, 3, 4, and 5) of the respective pages are stored in a specific area (222-1a) in correspondence with the document ID (docu0001) of that electronic document 1 subject to printing, and information of the total number of pages (5) of that document 1 and the two-sided print identifier (true) is also held in another area (222-2a), which is associated with the specific area (222-1a), in correspondence with the document ID (docu001) of the document 1.

Here, the document ID held in the print document attribute management table 222 is linked with the document ID held in the registered document attribute management table 221, so that, if the page ID registered in the print document attribute management table 222 can be known, the storage site of the electronic document data subject to printing and corresponding to this document ID can be known from the document ID corresponding to that page ID in the same table 222 through a link with the document ID of the same value in the registered document attribute management table 221.

Next, a description will be given of processing operation in a case where the paper documents (3401, 3402, and 3403) printed in the form shown in FIG. 10 is subjected to both-sided scanning by the image formation device 30.

Figure 12:
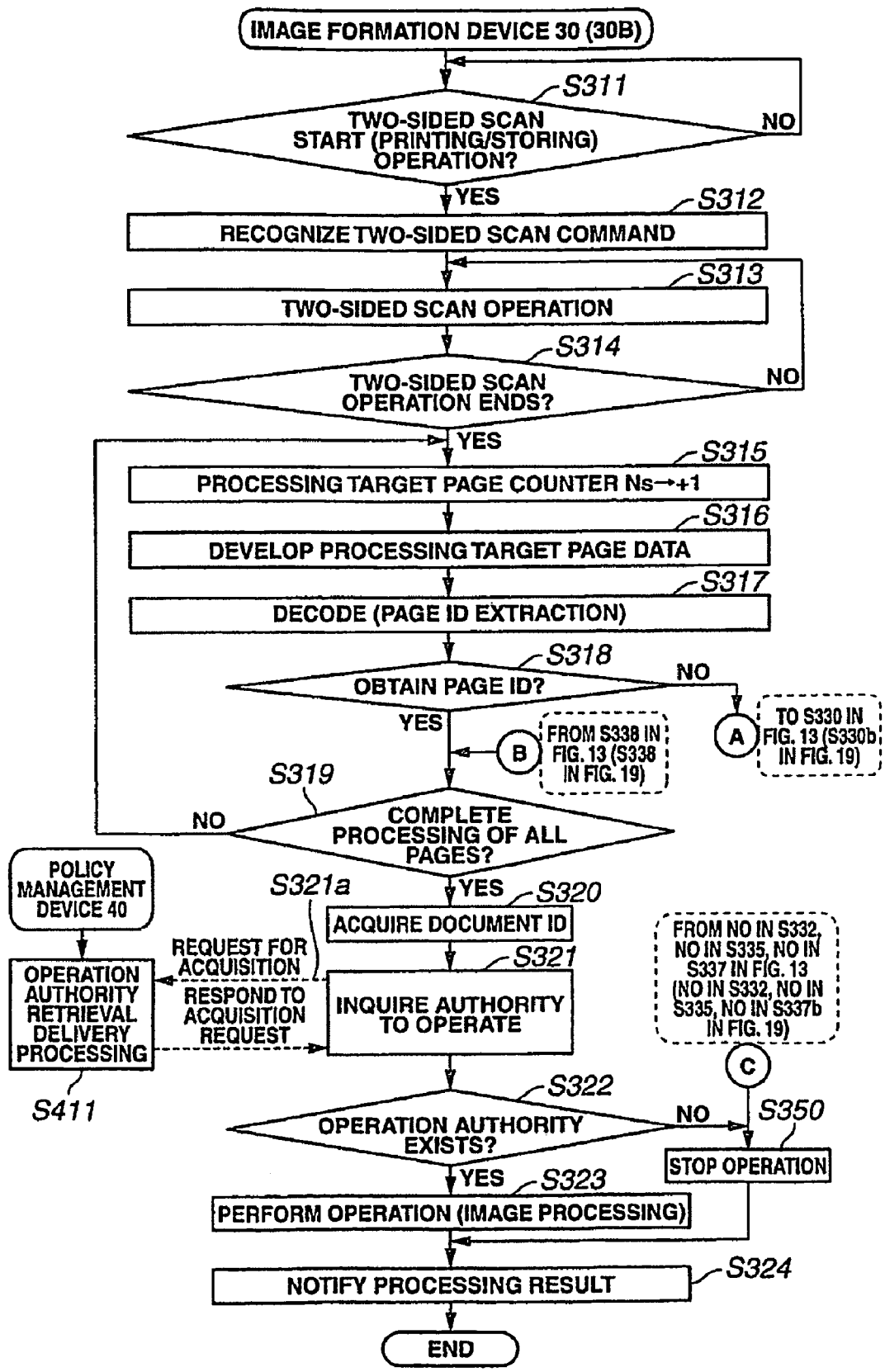
FIG. 12 is a diagram illustrating a control sequence related to a two-sided scan processing operation of a paper document in the first example.

FIG. 12 is a diagram illustrating a control sequence between the image formation device 30 and the policy management device 40 which are related to the processing operation of paper document two-sided scanning in this example.

In the case of the two-sided scanning of paper documents in the image formation device 30, the user sets those paper documents at a predetermined position of the DADF, then designates two-sided scanning at the display/operation section 35, and performs the scan start operation.

It should be noted that, as the types of operation of this scan start operation, at least two operations, including the operation (scan-in of the paper documents) in which the paper document is scanned and fetched and the operation in which the paper document is printed (copied), are conceivable.

In the image formation device 30, while on standby, the controller 36 consecutively executes two-sided scan operation with respect to all the set paper documents, in which the controller 36 monitors whether or not the aforementioned scan start operation is performed (Step S311), and if the scan start operation is performed (YES in Step S311), and if it is recognized that there is a designation of two-sided scanning (Step S312), the reader section 31 is driven such that after the first paper document set on the DADF is transported to a predetermined reading position on the platen and an image on one side (front side) of that paper document is scanned, the paper document is further transported and is inverted, and is subsequently sent rear again to the reading position to scan the other side (rear side) of that paper document. Image information (scan data) obtained by that scanning is temporarily fetched into, for example, the storage section 33 (Step S313).

In the meantime, the controller 36 monitors whether or not the above-described two-sided scan operation is finished (Step S314), and if the above-described two-sided scan operation is finished (YES in Step S314), an instruction to that effect is given to the read information extraction section 362. In consequence, the read information extraction section 362 proceeds to processing in which it fetches the scan data of each page consecutively for one page at a time from the scan data of all the paper documents subject to two-sided scanning obtained until then, and extracts the respective page ID from the scan data of each of the pages (Steps S315 to S319).

When proceeding to this processing, the read information extraction section 362 first increments a count value Ns of a to-be-processed page counter from an initial value "0" to "1" (Step S315), fetches and develops the scan data of the page corresponding to the to-be-processed page count value="1" (Step S316), and effects processing to decode the developed scan data of the first page and extract the page ID from that scan data (Step S317).

Here, if the page ID is extracted (YES in Step S318), processing is repeatedly executed in which the operation returns to Step S315 to increment the to-be-processed page count value Ns to a value of "+1" (add "1"), and then after going through Steps S316 to S319 to develop the scan data corresponding to that count value=Ns, the page ID is extracted from the scan data of that Ns-th page (Step S317).

In the meantime, after the page ID is extracted from the scan data of the Ns-th page (YES in Step S318), if it is recognized that the extraction processing of the page ID is finished for all pages (the scan data of a next page is absent) (YES in Step S319), the operation proceeds to document-processing allowance/rejection control processing (Steps S320 to S323).

In this processing, the document-processing allowance/rejection controller 365 first acquires the page ID at the time of extracting the page ID from the scan data of each page in the aforementioned Steps S315 to S319, as well as the document IDs respectively extracted by the read information extraction section 362 (Step S320).

Next, the document-processing allowance/rejection controller 365 effects processing in which, in response to the content of the scan start operation (operation of scan, copy, etc.) in the aforementioned Step S311 and by using as keys the document ID obtained in the aforementioned step S320 and the user ID obtained prior to that scan start (at the time of user authentication), the document-processing allowance/rejection controller 365 inquires of the policy management device 40 as to whether or not authority over the image information processing (scan, copy, etc.) based on the operation (scan start operation, copy start operation, etc.) by the user is present, and receives the operational authority information responded and sent by the policy management device 40 in response to that inquiry (Step S321). The document-processing allowance/rejection controller 365 then analyzes the received operational authority information and effects the processing of determining as to whether or not operational authority concerning the content of the aforementioned inquiry operation is present (Step S322).

In this processing, an authority acquisition request using the above-described information as a key is sent from the image formation device 30 to the policy management device 40 (Step S321a).

On the other hand, in the policy management device 40, upon receipt of the aforementioned authority acquisition request, the authority information retrieval delivery processing section 453 determines authority information corresponding to that key information from the operational authority information management table 431, and responds and sends it to the image formation device 30 of the request destination (Step S4111).

On the basis of the authority information which is sent in response, if it is determined by the document-processing allowance/rejection controller 365 of the image formation device 30 that authority over image information processing (two-sided scan, two-sided copy, etc.) based on the scan start operation (two-sided scan start operation, two-sided copy start operation, etc.) by the user in the aforementioned Step S311 is present (YES in Step S322), the scan image processing section 364 executes image processing with respect to the two-sided scan data (containing scan data of respective pages, including the front sides and the rear sides, of all the paper documents subject to two-sided scan) in accordance with the content of the operation of the scan start operation (scan, copy operation, etc.) in the aforementioned Step S311 (Step S323). After completion of the image processing, the result of processing is notified (Step S324), and the operation returns to a standby state.

In contrast, if it is determined in the aforementioned Step 322 that the above-described operational authority is absent (NO in Step S322), the operation is stopped (Step S350), the scan data is deleted, an error message indicating an authority error is displayed, and the abnormality is notified to the user, whereupon the operation returns to the standby state to receive the scanning of an ensuing paper document.

Meanwhile, during the above-described series of processing, in a case where the page ID cannot be extracted (NO in Step S318) at the time of the page ID extraction processing in the aforementioned Step S317 before the page ID extraction processing of all pages among the entire scan data is completed (NO in Step S319), the operation proceeds to the check processing of added information on the rear side (Step S330) shown in FIG. 13.

After the operation proceeds to the check processing of added information on the rear side shown in FIG. 13, the scan image processing section 364 checks whether the two-sided scan page to be processed is a front side or a rear side on the basis of the to-be-processed page count value Ns at this time (Step S331).

In this processing, the scan image processing section 364 determines that the two-sided scan page to be processed is the front side or the rear side in two-sided scan, depending on whether the to-be-processed page count value Ns is a value of an odd number or a value of an even number.

In the aforementioned Step S331, if it is determined in accordance with the above-described judgment condition that the two-sided scan page to be processed is the front side in two-sided scan ("FRONT SIDE" in FIG. S331), the scan image processing section 364 increments the to-be-processed page count value Ns to "+1," attempts to fetch that page [(Ns+1)-th page (namely, a page next to Ns for which the page ID could not be extracted), and checks whether or not there is scan data of the page [(Ns+1)-th page] next to the Ns-th page for which the page ID could not be extracted (Step S332).

Here, if it is determined that the scan data of the (Ns+1)-th page is not present (NO in Step S332), the operation returns to Step S350 shown in FIG. 12 to stop the operation, and its result is notified (Step S324), whereupon the processing ends.

On the other hand, if it is determined that the scan data of the (Ns+1)-th page is present (YES in Step S332), the scan image processing section 364 develops the scan data of that (Ns+1)-th page (Step S333), and effects the processing of extracting the page ID from the scan data of that page (Step S334).

Here, if the page ID could not be acquired (NO in Step S335), the operation returns to Step S350 shown in FIG. 12 to stop the operation, and its result is notified (Step S324), whereupon the processing ends.

On the other hand, if the page ID could be acquired (YES in Step S335), the aforementioned developed data of the page is decoded to read the respective added data of the page number N, the total number of pages Ntot, and the two-sided print identifier (Step S336).

Next, on the basis of the added data fetched, a check is made as to whether or not the two-sided print identifier is true, and the page number N is equal to the total number of pages Ntot (Step S337).

Here, if a determination result is obtained that the above-described conditions (the two-sided print identifier is true, and the page number N=the total number of pages Ntot) are not satisfied (NO in Step S337), the operation returns to Step S350 shown in FIG. 12 to stop the operation, and its result is notified (Step S324), whereupon the processing ends.

On the other hand, if a determination result is obtained that the above-described conditions (the two-sided print identifier is true, and the page number N=the total number of pages Ntot) are satisfied (YES in Step S337), the scan data of the Ns-th page for which the page ID cannot be extracted in the aforementioned Step S318 is ignored (deleted) (Step S338), and after the scan data of the (Ns+1)-th page is moved rear to the scan data of the (Ns−1)-th page, the operation returns to Step S319 of FIG. 12, and the processing in Steps S315 to S318 is continued until it is determined in Step S319 that the processing of all pages is finished (YES in Step S319).

It should be noted that the above-described series of processing continuing from "FRONT SIDE" in Step S331 to S338 through "YES" in S332, S333, S334, "YES" in S335, S336, and "YES" in S337 (in the same way as the processing continuing from "REAR SIDE" in Step S331 to S338 through S340, S336, and "YES." in S337, which will be described later) is processing for ensuing the following: After recognizing the fact that the page ID cannot be extracted from the scan data of the Ns-th page in the aforementioned Step S318 (see FIG. 12) is ascribable to the fact that that Ns-th page is a page corresponding to the rear side of a paper document whose final page was subjected to two-sided printing at the time of two-sided printing of an electronic document formed by an odd number of pages, in distinction from the case where the imparted page ID cannot be read due to the deterioration of the image and so on, and after it is confirmed that it is normal for the scan data of that Ns-th page to be absent (it is appropriate to skip it), the scan data is deleted (ignored), and the page ID extraction processing of the scan data of the subsequent pages is continued without delay.

Meanwhile, in the above-described series of processing, if it is determined in Step S331 of FIG. 13 that the two-sided scan page to be processed is the rear side in two-sided scan ("REAR SIDE" in FIG. S331), the scan image processing section 364 develops again the scan data of the page [(Ns−1)-th page] preceding the Ns-th page for which the page ID cannot be extracted (Step S340). Then, the scan image processing section 364 decodes the developed data, and reads the respective added data of the page number N, the total number of pages Ntot, and the two-sided print identifier from the scan data of that (Ns−1)-th page (Step S336).

Next, on the basis of the added data fetched, a check is made as to whether or not the two-sided print identifier is true, and the page number N is equal to the total number of pages Ntot (Step S337).

Here, if a determination result is obtained that the above-described conditions (the two-sided print identifier is true, and the page number N=the total number of pages Ntot) are not satisfied (NO in Step S337), the operation returns to Step S350 shown in FIG. 12 to stop the operation, and its result is notified (Step S324), whereupon the processing ends.

On the other hand, if a determination result is obtained that the above-described conditions (the two-sided print identifier is true, and the page number N=the total number of pages Ntot) are satisfied (YES in Step S337), the scan data of the Ns-th page for which the page ID cannot be extracted in the aforementioned Step S318 (see FIG. 12) is ignored (deleted), and the operation proceeds to page ID extraction processing (Step S338) of the scan data in and after the page [(Ns+1)-th page] next to the Ns-th page for which the page ID cannot be extracted.

As the transient processing in this case, if a determination result is obtained that the above-described conditions (the two-sided print identifier is true, and the page number N=the total number of pages Ntot) are satisfied (YES in Step S337), after the to-be-processed page count value Ns is first incremented to "+1," the operation returns to Step S319 of FIG. 12, and the processing in Steps S315 to S318 is continued until it is determined in Step S319 that the processing of all pages is finished.

Next, referring to FIGS. 14A, 14B, and 14C and FIGS. 15A, 15B, and 15C, a description will be given of specific examples of the series of paper document two-sided scan processing operation shown in FIGS. 12 and 13.

FIGS. 14A, 14B, and 14C and FIGS. 15A, 15B, and 15C in both cases show an example of a case where the three paper documents 3401, 3402, and 3403 (see FIG. 10) obtained by subjecting the document 1 to two-sided printing are set in the order of the paper documents 3401, 3403, and 3402, and are subjected to two-sided scanning.

It should be noted that, in FIGS. 14A, 14B, and 14C and FIGS. 15A, 15B, and 15C, as for the paper documents 3401, 3403, and 3402, the front side (F) is shown by a solid line, and the rear side (R) is shown by a dotted line, respectively. Each of the figures conceptually (planarly) shows a mode in which two-sided scan is effected in the order of the paper documents 3401, 3403, and 3402 from the observer's left end toward the right end in the drawing.

Here, the paper document 3403 is the result of two-sided printing of the final page (5th page) of that document 1, and the image of the electronic document data of the fifth page is printed on the front side together with the added data of the document ID, the page ID, and the like. However, since the relevant print page is absent on the rear side, the rear side is outputted in a form of a blank sheet.

Figure 14:
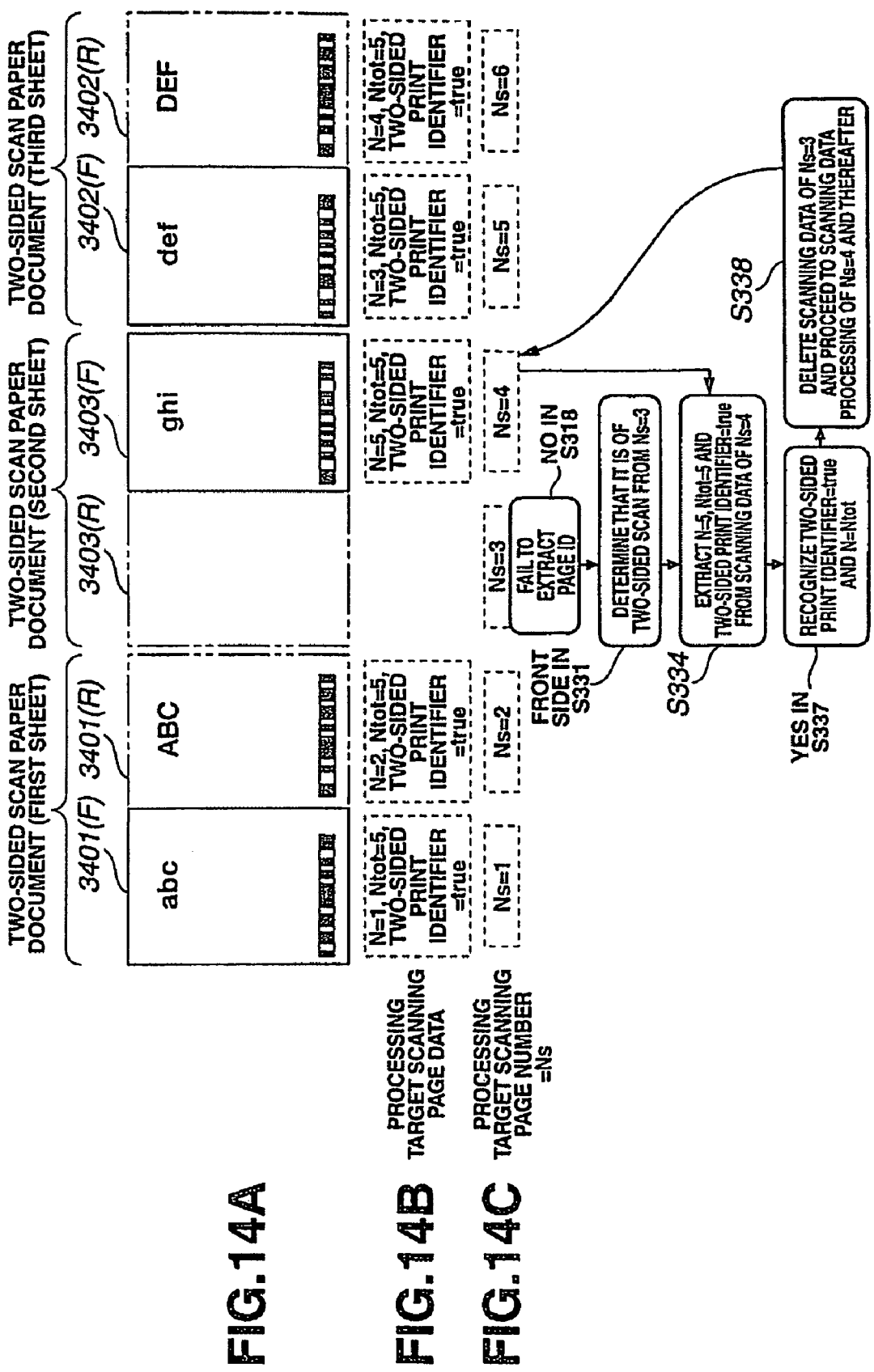
FIGS. 14A to 14C are conceptual diagrams illustrating specific examples of the two-sided scan processing operation of the paper document in the first example.
Figure 15:
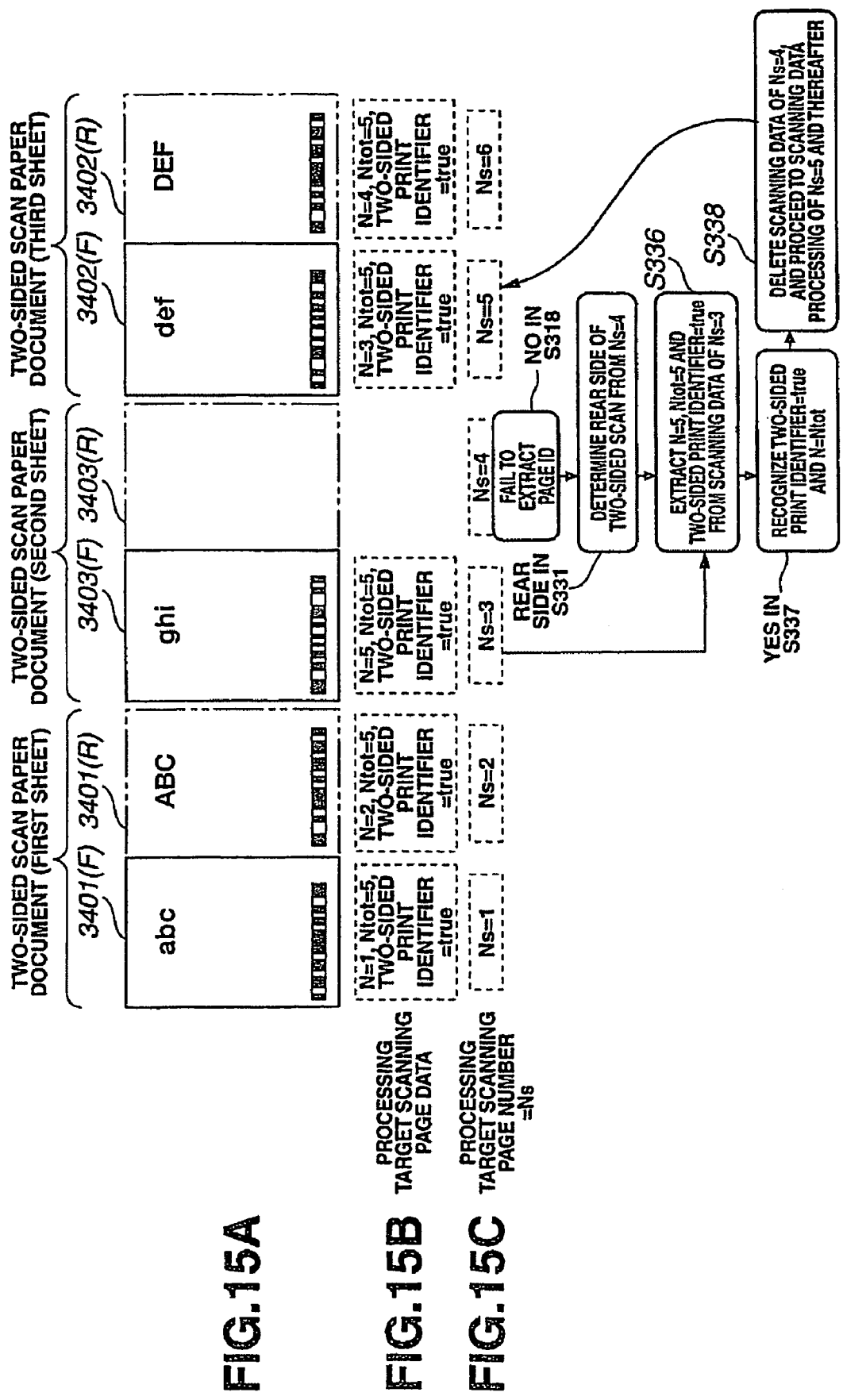
FIGS. 15A to 15C are conceptual diagrams illustrating another specific examples of the two-sided scan processing operation of the paper document in the first example.

Of FIGS. 14A, 14B, and 14C and FIGS. 15A, 15B, and 15C which were cited as specific examples, FIGS. 14A, 14B, and 14C, in particular, show an example of the form of two-sided scanning when the paper document 3403, which is the result of two-sided printing of the final page (fifth page) of the document 1, is inserted between the paper document 3401, which is the result of two-sided printing of the first and second pages of the document 1, and the paper document 3402, which is the result of two-sided printing of the third and fourth pages of the document 1, in a state where the blank page (rear side) is first scanned in the two-sided scanning, and the front side is then scanned [in the state where the page number (Ns) of the to-be-processed scan page in the process of extracting the page ID by fetching the scan data for each page from the two-sided scan data after execution of two-sided scanning becomes an odd-numbered page (the third page in this example)]. On the other hand, FIGS. 15A, 15B, and 15C show an example of the form of two-sided scanning when the aforementioned paper document 3403 is inserted between the paper document 3401 and the paper document 3402 in a state where the front side is first scanned in the two-sided scanning, and the blank page (rear side) is then scanned [in the state where the page number (Ns) of the to-be-processed scan page becomes an even-numbered page (the fourth page in this example)].

In FIGS. 14A, 14B, and 14C, if two-sided scanning is executed in the order of the paper documents 3401, 3403, and 3402 (FIG. 14A), then the scan data of an image on the front side (F) of the paper document 3401 (the first two-sided scan original), the scan data of an image on the rear side (R) thereof, the scan data of an image on the rear side (R) of the paper document 3403 (the second two-sided scan original), the scan data of an image on the front side (F) thereof, the scan data of an image on the front side (F) of the paper document 3402 (the third two-sided scan original), and the scan data of an image on the rear side (R) thereof are sequentially outputted from the reader section 31. The scan data of the respective outputted pages are arranged in the order of output, and are held in the storage section 33 as the two-sided scan data of one job (two-sided scanning of the paper documents 3401, 3402, and 3403) portion.

Here, the scan data of the image on the front side (F) of the paper document 3401 (the first two-sided scan original), the scan data of the image on the rear side (R) thereof, the scan data of the image on the front side (F) of the paper document 3403 (the second two-sided scan original), the scan data of the image on the front side (F) of the paper document 3402 (the third two-sided scan original), and the scan data of the image on the rear side (R) thereof respectively contain added data [(page number N=1, the total number of pages Ntot=5, and the two-sided print identifier=true), (page number N=2, the total number of pages Ntot=5, and the two-sided print identifier=true), (page number N=5, the total number of pages Ntot=5, and the two-sided print identifier=true), (page number N=3, the total number of pages Ntot=5, and the two-sided print identifier=true), and (page number N=4, the total number of pages Ntot=5, and the two-sided print identifier=true)], as shown in FIG. 14B, [the document data of each of the pages, the document ID=docu001, the page IDs=(P0011), (P0012), (P0013), (P0014), and (P0011) are not shown].

In addition, the added data of the aforementioned document data, the document ID, and the page ID are not contained in the scan data (scan data corresponding to the to-be-processed page Ns=3) of the image on the rear side (R) of the paper document 3403 (the second two-sided scan original).

As a result, subsequently, while the to-be-processed page Ns is incremented from "1" to "2," "3," "4," "5," and "6" in that order, the processing of extracting the page IDs is executed by sequentially fetching, from the scan data of one job portion in correspondence with the value of the Ns, the scan data of an image on the front side (F) of the paper document 3401 (the first two-sided scan original), the scan data of an image on the rear side (R) thereof, the scan data of an image on the rear side (R) of the paper document 3403 (the second two-sided scan original), the scan data of an image on the front side (F) thereof, the scan data of an image on the front side (F) of the paper document 3402 (the third two-sided scan original), and the scan data of an image on the rear side (R) thereof. In this page ID extraction processing, when the to-be-processed page count value reaches Ns=3, a determination is made that the page ID cannot be extracted from the scan data of the image on the rear side (R) of the paper document 3403 (the second sheet of tow-sided scan) (refer to NO in S318 of FIG. 12).

After this determination, in the scan image processing section 364, from the value of the to-be-processed page count value Ns=3 at the time of the determination, a determination is made that the page to be processed is the front side in two-sided scan (the second sheet of two-sided scanning) (refer to "FRONT SIDE" in S331 of FIG. 13), and the processing of extracting the page ID is effected by fetching the scan data of its rear side, i.e., the page [(Ns+1)=page 4] next to Ns (=3) (refer to S332 to S335 of FIG. 13).

At the time of this processing, since the page ID=P0015 (not shown) can be extracted from the scan data of (Ns+1)=page 4, the scan image processing section 364 continues to extract information of the page number N=5, the total number of pages Ntot=5, and the two-sided print identifier=true from the scan data of that fourth page (refer to YES in S335 and S336 of FIG. 13).

Then, on the basis of the respective information extracted, a determination is made that the two-sided print identifier is true and that the page number N (=5) and the total number of pages Ntot (=5) are equal, the scan data of Ns=3 for which the page ID cannot be extracted is deleted, and the page ID extraction processing of the scan data of the respective pages of Ns=4 and up to 6 is continued (refer to YES in S337 and S338 of FIG. 13).

In this example, the page IDs=P0015, P0013, and P0014 are respectively extracted from the scan data of the respective pages of the to-be-processed pages Ns=4, 5, and 6. After the page ID=P0014 is finally extracted, a determination is made that the processing of all pages of the two-sided scanning is finished, and the operation proceeds to document processing allowance/rejection control (refer to YES in S319 and S320 to S323 of FIG. 12).

In this document processing allowance/rejection control, an inquiry is made to the policy management device 40 about the authority over two-sided scan operation by using as keys the document ID=docu001 and the user ID respectively extracted from the scan data of all pages, and if it is determined that the authority is present, document processing (two-sided scan-in, two-sided copy, etc.) corresponding to the operation instructed in the aforementioned Step S311 (see FIG. 12) is executed.

In FIGS. 15A, 15B, and 15C, if two-sided scanning is executed in the order of the paper documents 3401, 3403, and 3402 (FIG. 15A), then the scan data of an image on the front side (F) of the paper document 3401 (the first two-sided scan original), the scan data of an image on the rear side (R) thereof, the scan data of an image on the front side (F) of the paper document 3403 (the second two-sided scan original), the scan data of an image on the rear side (R) thereof, the scan data of an image on the front side (F) of the paper document 3402 (the third two-sided scan original), and the scan data of an image on the rear side (R) thereof are sequentially outputted from the reader section 31. The scan data of the respective outputted pages are arranged in the order of output, and are held in the storage section 33 as the two-sided scan data of one job portion.

Here, the scan data of the image on the front side (F) of the paper document 3401 (the first two-sided scan original), the scan data of the image on the rear side (R) thereof, the scan data of the image on the front side (F) of the paper document 3403 (the second two-sided scan original), the scan data of the image on the front side (F) of the paper document 3402 (the third two-sided scan original), and the scan data of the image on the rear side (R) thereof respectively contain added data [(page number N=1, the total number of pages Ntot=5, and the two-sided print identifier=true), (page number N=2, the total number of pages Ntot=5, and the two-sided print identifier=true), (page number N=5, the total number of pages Ntot=5, and the two-sided print identifier=true), (page number N=3, the total number of pages Ntot=5, and the two-sided print identifier=true), and (page number N=4, the total number of pages Ntot=5, and the two-sided print identifier=true)], as shown in FIG. 14B, [the document data of each of the pages, the document ID=docu001, the page IDs=(P0011), (P0012), (P0013), (P0014), and (P0011) are not shown].

In addition, the added data of the aforementioned document data, the document ID, and the page ID are not contained in the scan data (scan data corresponding to the to-be-processed page Ns=4) of the image on the rear side (R) of the paper document 3403 (the second two-sided scan original).

As a result, subsequently, while the to-be-processed page Ns is incremented from "1" to "2," "3," "4," "5," and "6" in that order, the processing of extracting the page IDs is executed by sequentially fetching, from the scan data of one job portion in correspondence with the value of the Ns, the scan data of an image on the front side (F) of the paper document 3401 (the first two-sided scan original), the scan data of an image on the rear side (R) thereof, the scan data of an image on the front side (F) of the paper document 3403 (the second two-sided scan original), the scan data of an image on the rear side (R) thereof, the scan data of an image on the front side (F) of the paper document 3402 (the third two-sided scan original), and the scan data of an image on the rear side (R) thereof. In this page ID extraction processing, when the to-be-processed page count value reaches Ns=4, a determination is made that the page ID cannot be extracted from the scan data of the image on the rear side (R) of the paper document 3403 (the second sheet of tow-sided scan) (refer to NO in S318 of FIG. 12).

After this determination, in the scan image processing section 364, from the value of the to-be-processed page count value Ns=4 at the time of the determination, a determination is made that the page to be processed is the rear side in two-sided scan (the second sheet of two-sided scanning) (refer to "REAR SIDE" in S331 of FIG. 13), and information of the page number N=5, the total number of pages Ntot=5, and the two-sided print identifier=true is extracted from the'scan data of the third page by fetching the scan data of its rear side, i.e., the page [(Ns−1)=page 3] preceding Ns (=4) (refer to S336 of FIG. 13).

Then, on the basis of the respective information extracted, a determination is made that the two-sided print identifier is true and that the page number N (=5) and the total number of pages Ntot (=5) are equal, the scan data of Ns=3 for which the page ID cannot be extracted is deleted, and the page ID extraction processing of the scan data of the respective pages of Ns=4 and up to 6 is continued (refer to YES in S337 and S338 of FIG. 13).

In this example, the page IDs=P0015, P0013, and P0014 are respectively extracted from the scan data of the respective pages of the to-be-processed pages Ns=3, 5, and 6. After the page ID=P0014 is finally extracted, a determination is made that the processing of all pages of the two-sided scanning is finished, and the operation proceeds to document processing allowance/rejection control (refer to YES in S319 and S320 to S323 of FIG. 12).

In this document processing allowance/rejection control, an inquiry is made to the policy management device 40 about the authority over two-sided scan operation by using as keys the document ID=docu0011 and the user ID respectively extracted from the scan data of all pages, and if it is determined that the authority is present, document processing (two-sided scan-in, two-sided copy, etc.) corresponding to the operation instructed in the aforementioned Step S311 (see FIG. 12) is executed.

Second Example

As for the system in accordance with the second example, in the system configuration shown in FIG. 1, the client terminal 10 and the image formation device 30 are substituted by a client terminal 10B and an image formation device 30B, respectively, and the document management device 20 and the policy management device 40 are configured by using ones similar to those of the first example.

The client terminal 10B in terms of its functional block is identical to the client terminal 10 in accordance with the first example. In particular, however, the document-attribute-information generation section 144 has the function of generating the information of the document ID, the total number of pages, the page ID of each page, and a rear-side mark presence identifier [having a value (true) indicating that a mark (page ID etc.) is present on the rear side or a value (false) indicating that the mark is absent] as information to be imparted to each page on the basis of the electronic document data subject to printing at the time of two-sided printing. Meanwhile, the application section 141 has the function of generating a two-sided print job in which two-sided printing is possible by adding the aforementioned added data to each page.

In addition, the image formation device 30B in terms of its functional block is identical to the image formation device 30 (see FIG. 4) in accordance with the first example. In particular, however, the print controller 361 has a control function of two-sided printing whereby, on the basis of the two-sided print instruction (the aforementioned two-sided print job) of the electronic document from the client terminal 10B, the electronic document is subjected to two-sided printing for each page on each printing surface corresponding to the logical page of each page by adding thereto the document ID, each page ID, the total number of pages, and the rear-side mark presence identifier. Meanwhile, the scan image processing section 364 has a processing function whereby the scan data of a page Ns subject to ID extraction is consecutively fetched to extract the page ID from the scan data of all pages obtained by the two-sided printing of the paper documents effected by the reader section 31 on the basis of the two-sided scan operation by the user with respect to the paper documents subjected to two-sided printing by the aforementioned two-sided printing control function. In this processing function, if it is not possible to extract the page ID from Ns-th scan data, the page ID is extracted on the basis of the respective information of the page ID and the rear-side mark presence identifier extracted from the scan data of an (Ns−1)-th page (immediately preceding page) or an (Ns+1)-th page (next page), and if the extracted rear-side mark presence identifier is the value (false) indicating the absence of the rear side mark, it is determined that the page Ns for which the page ID cannot be extracted is a page to be appropriately deleted [a page corresponding to the rear side (rear side of a final printed sheet) of a paper document in which a final page of an electronic document having an odd number of pages has been subjected to two-sided printing].

Processing functions of the respective functional blocks other than those described above in the client terminal 10B and the image formation device 30B are similar to those of the corresponding functional blocks in the client terminal 10 and the image formation device 30 in accordance with the first example.

Hereafter, a description will be given in due order of the document two-sided printing and two-sided scan processing in the system in accordance with this example.

It should be noted that the document registration processing in the system of this example is similar to that of the first example (see FIG. 6), and a detailed description here will be omitted.

Figure 16:
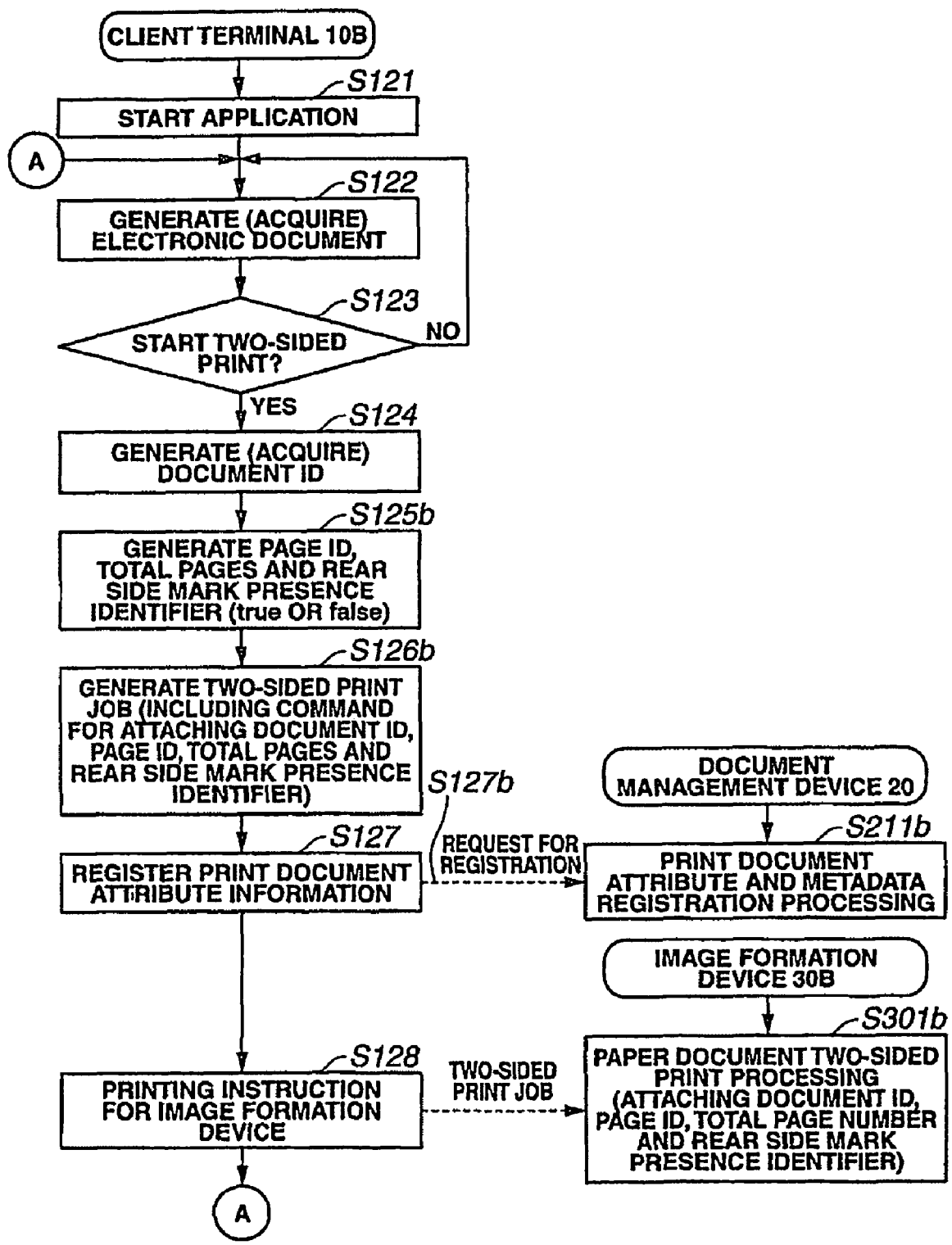
FIG. 16 is a diagram illustrating a control sequence related to two-sided print processing of the electronic document in a second example.

FIG. 16 is a diagram illustrating a control sequence among the client terminal 10B, the document management device 20, and the image formation device 30B which are related to the two-sided print processing of an electronic document in the system of this example.

In the drawing, processing steps which are identical to those of the two-sided print processing in the first example shown in FIG. 9 are denoted by the same reference numerals.

It should be noted that, in FIG. 16, each processing indicated by a reference character "b" at the end of a step numeral is peculiar to this example, and a description will be given mainly of that processing.

As shown in FIG. 16, in the client terminal 10B, after an application is started (Step S121), and electronic document data is generated or acquired (Step S122), if a two-sided print instruction has been given (YES in Step S123), the document-attribute-information generation section 144 generates a document ID for identifying the electronic document for which the print instruction has been given (Step S124). Then, the document-attribute-information generation section 144 analyzes the print-instructed electronic document data, and generates the page ID of each page of the electronic document data, the total number of pages of the electronic document, and the rear-side mark presence identifier corresponding to each of the pages (Step S125b).

In the generation of this rear-side mark presence identifier, after grasping, for each page of the print-instructed electronic document, on which printing surface (front or rear) of which recording sheet each page is to be printed, with respect to each of the pages, if information (page ID etc.) to be printed on the other side (the rear side if the recording side is the front side, and the front side if the recording side is the rear side) of the side of the recording sheet where each page is printed is present, information of "true" indicating that "the rear side mark is present" is generated in correspondence with that page. Meanwhile, if the information to be printed on the other side is absent, information of "false" indicating that "the rear side mark is absent" is generated in correspondence with that page.

Consequently, in a case where an electronic document whose total number of pages Ntot is an odd number is instructed for two-sided printing, the rear-side mark presence identifier having a value of "true" is respectively generated in correspondence with each page up to (Ntot−1), and the rear-side mark presence identifier having a value of "false" is generated in correspondence with the page (final page) of Ntot.

After the aforementioned rear-side mark presence identifier is generated, the print job generation section 143 generates a two-sided print job from the electronic document data generated (or acquired) in the aforementioned Step S122 and from respective information of the document ID, the page ID, the total number of pages, and the rear-side mark presence identifier generated in the aforementioned Steps S124 and S125b (Step S126b).

Here, the print job generation section 143 generates a two-sided print job in which a rendering command is described to render on both sides the electronic document data of each page, for which two-sided print instruction has been given, by imparting to each page a document ID, a page number, a page ID corresponding to each page, and the rear-side mark presence identifier, more specifically a command to render on both sides a two-dimensional barcode in which the electronic document data, as well as respective values of the page ID having a hash value calculated on the basis of the electronic document data of that page, the total number of pages, and the rear-side mark presence identifier, are held for each page individually identifiably (machine readably).

After generating the above-described print job, the information registration/acquisition section 142 executes processing (Step S127) for registering the document ID of the electronic document subject to printing and generated (or acquired) in Step S124, as well as the respective information of the page ID, the total number of pages, and the rear-side mark presence identifier generated in Step S125 in a respectively corresponding manner.

At the time of this registration processing of print document attribute information, the information registration/acquisition section 142 sends to the document management device 20 a registration request containing the respective information of the document ID of the aforementioned electronic document subject to printing, the page ID of that electronic document, the total number of pages, and the rear-side mark presence identifier (Step S127b).

On the other hand, in the document management device 20, when the aforementioned print document attribute data registration request sent by the client terminal 10 is received by the processing request reception section 241, the information management section 242 extracts individually the respective information of the document ID, the page ID of each page, the total number of pages, and the rear-side mark presence identifier contained in that registration request, and stores in a mutually corresponding manner the respective information in, for example, the print document attribute management table 222 of the storage section 22 (Step S211b: print document attribute and meta data registration processing).

Subsequently, the print job generation section 143 effects print instruction processing in which the two-sided print job generated in the aforementioned Step S126 is sent to the image formation device 30 through the communication interface (I/F) section 15 via the NW 60 (Step S128).

On the other hand, in the image formation device 30, upon receiving through the communication interface (I/F) section 37 the aforementioned two-sided print job sent by the client terminal 10, the print controller 361 executes the two-sided print processing (Step S301b) of the paper document on the basis of the two-sided print job.

In this two-sided print processing of the paper documents, the print controller 361 analyzes the rendering command in the received two-sided print job, and print image data capable of rendering that electronic document data, in conjunction with the two-dimensional barcode corresponding to each of the total number of pages, the page ID corresponding to that page, and the rear-side mark presence identifier, is generated for each page by the image processing section 32 in accordance with the result of that analysis. On this basis of this print image data, an image of the electronic document data of that page, as well as a two-dimensional barcode image containing on each page the document ID, the total number of pages, and the rear-side mark presence identifier, are printed out as a two-sided printed paper document formed on the front side or the rear side (each printing surface corresponding to the logical page of each page) of the recording sheet respectively corresponding to each page.

Figure 17:
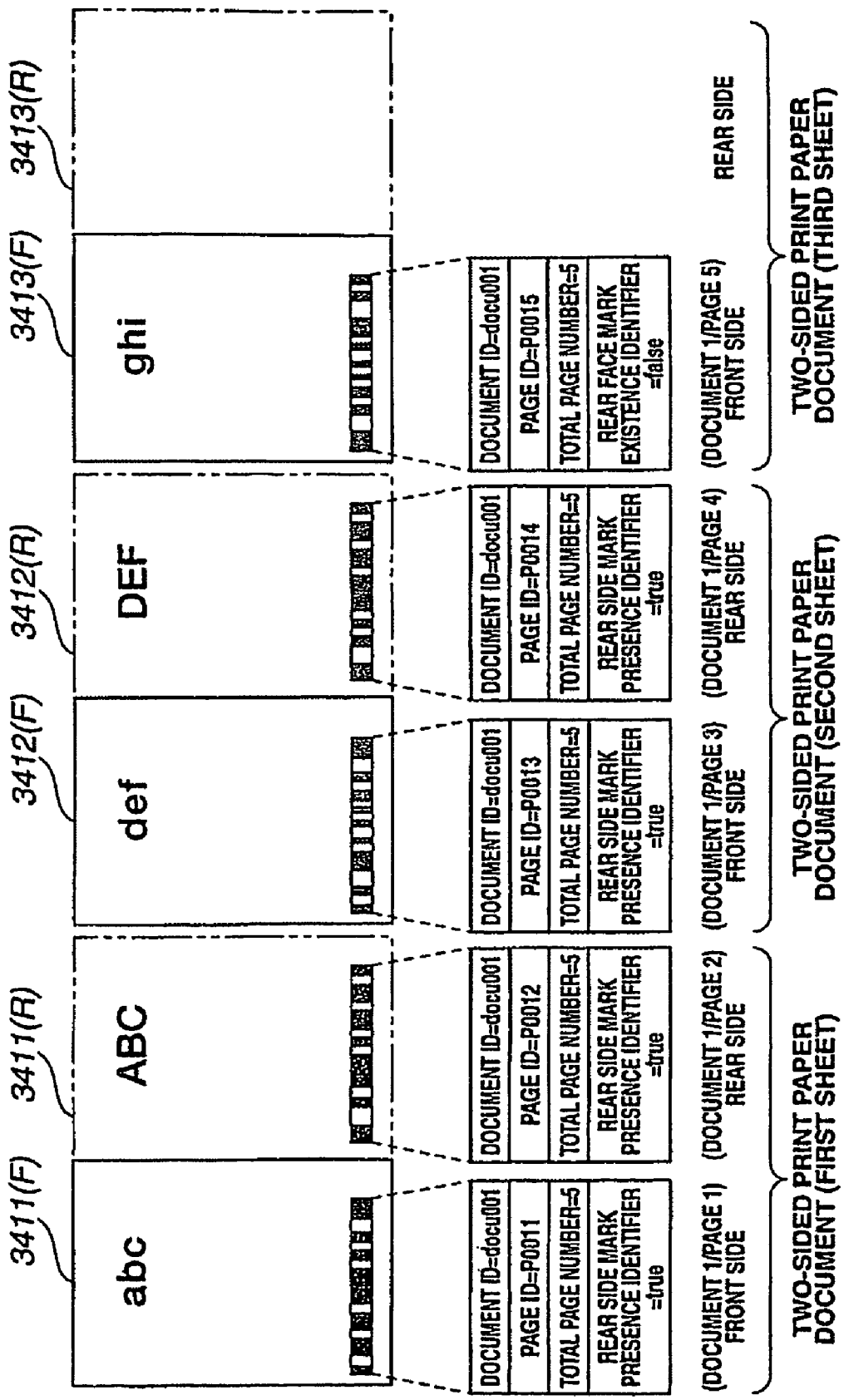
FIG. 17 is a conceptual diagram illustrating an example of a two-sided printout of paper documents by the image formation device in the second example.

FIG. 17 is a conceptual diagram illustrating an example of a two-sided printout of paper documents by the image formation device 30B in Step S301b of FIG. 16.

Using a similar manner to that of FIG. 10, FIG. 17 conceptually (planarly) shows an example at a time when the document 1 having the document ID of "docu001" and constituted by, for example, 5-page electronic document data is subjected to two-sided printing by using three recording sheets, and is printed out as paper documents 3411, 3412, and 3413.

As shown in FIG. 17, when the user instructs the two-sided printing of the document 1 from the client terminal 10B, the image formation device 30B, upon receiving the above-described two-sided print job based on that two-sided print instruction, first fetches a first recording sheet, and forms on its front side (F: printing surface corresponding to the first page) an image (=abc) corresponding to the electronic document data of the first page of that document 1, as well as images (in this example, these images are grouped together at one location and are formed by a two-dimensional barcode) of the respective information of the document ID (=docu001) of that document 1, the page ID (=P0011) corresponding to that first page, the total number of pages (=5), and the rear-side mark presence identifier (=true). Then, the image formation device 30B invertedly transports and fetches that first recording sheet, forms on its rear side (R: printing surface corresponding to the second page) an image (=ABC) corresponding to the electronic document data of the second page, as well as a two-dimensional barcode in which the respective information of the document ID (=docu001), the page ID (=P0012) corresponding to that second page, the total number of pages (=5), and the rear-side mark presence identifier (=true) is grouped together, and outputs the sheet as the paper document 3411 corresponding to the first two-sided printed sheet.

Next, the image formation device 30B fetches a second recording sheet, and forms on its front side (F: printing surface corresponding to the third page) an image (=def) corresponding to the electronic document data of the third page, as well as a two-dimensional barcode in which the respective information of the document ID (=docu001), the page ID (=P0013) corresponding to the third page, the total number of pages (=5), and the rear-side mark presence identifier (=true) are grouped together. Then, the image formation device 30B invertedly transports and fetches that second recording sheet, forms on its rear side (R: printing surface corresponding to the fourth page) an image (=DEF) corresponding to the electronic document data of the fourth page, as well as a two-dimensional barcode in which the respective information of the document ID (=docu001), the page ID (=P0014) corresponding to that fourth page, the total number of pages (=5), and the rear-side mark presence identifier (=true) is grouped together, and outputs the sheet as the paper document 3412 corresponding to the second two-sided printed sheet.

Further, the image formation device 30B fetches a third recording sheet, and forms on its front side (F: printing surface corresponding to the fifth page) an image (=ghi) corresponding to the electronic document data of the fifth page, as well as a two-dimensional barcode in which the respective information of the document ID (=docu001), the page ID (=P0015) corresponding to that fifth page, the total number of pages (=5), and the rear-side mark presence identifier (=false) are grouped together. Then, the image formation device 30B invertedly transports and fetches that third recording sheet, and outputs the sheet as the paper document 3413 corresponding to the third two-sided-printed sheet without forming an image on the rear side (R) (in the form of a blank sheet), whereupon the two-sided printing operation ends.

It should be noted that, in a case where the document 1 is outputted in two-sided printing by the image formation device 30B as the paper document with the document ID, the page ID, the total number of pages, and the rear-side mark presence identifier imparted to each page on the basis of the two-sided print instruction from the client terminal 10B, as shown in FIG. 17, in the document management device 20, the print document attribute information concerning that document 1 is held in the print document attribute management table 222 through the print document attribute and meta data registration processing in Step S211b of FIG. 16.

FIG. 18 is a table illustrating an example of information held in the print document attribute management table 222 of the document management device 20.

As shown in FIG. 18, at the time of the two-sided printing of the electronic document 1, the page IDs (P0011, P0012, P0013, P0014, and P0015) of the respective pages 1 to 5 of that document 1 and the rear-side mark presence identifiers (true, true, true, true, and false) of the respective pages are stored in a specific area (222-1b) in correspondence with the document ID (docu0001) of the electronic document 1, and information of the total number of pages (5) of that document 1 is also held in another area (222-2b), which is associated with that specific area (222-1b), in correspondence with the document ID (docu001) of that document 1.

Next, referring to FIGS. 12 and 19, a description will be given of processing operation in a case where the paper documents (3411, 3412, and 3413) printed in the form shown in FIG. 17 is subjected to both-sided scanning by the image formation device 30B.

In the image formation device 30B, when the user sets the paper documents (3411, 3412, and 3413) at a predetermined position of the DADF, then designates two-sided scanning at the display/operation section 35, and performs the scan start operation, then, as shown in FIG. 12, the controller 36 recognizes the scan start operation (YES in Step S311), and subsequently executes the series of processing in and after Step S312.

In the image formation device 30B, in the series of processing shown in FIG. 12, the processing operation other than the case (NO in Step S318) in which the page ID cannot be extracted in Step S318 is similar to that of the first example, so that a detailed description thereof will be omitted here.

In addition, in the image formation device 30B, the check processing of added information on the rear side in a case where the page ID cannot be extracted in Step S318 shown in FIG. 12 is executed in accordance with the flowchart shown in FIG. 19.

Namely, in this image formation device 30B, the scan start operation is recognized in Step S311 of FIG. 12, and then by recognizing that the job is two-sided scan in Step S312, the two-sided scan of that paper document is executed (Step S313). From the scan data obtained by completing the scanning of all the paper documents (Step S314), and the processing of extracting the page ID by fetching the scan data of the Ns-th page is continued (Steps S315 to S319). During this series of processing, in a case where the page ID cannot be extracted (NO in Step S318) at the time of the page ID extraction processing in Step S317 before the page ID extraction processing of all pages among the aforementioned scan data is completed (NO in Step S319), the operation proceeds to the check processing of added information on the rear side (Step S330b) shown in FIG. 19.

It should be noted that, in FIG. 19, processing steps identical to the processing steps in the check processing of added information on the rear side in the first example shown in FIG. 13 are denoted by the same reference numerals (each processing indicated by a reference character "b" at the end of the step numeral is peculiar to this second example).

After proceeding to the check processing of added information on the rear side shown in FIG. 19, the scan image processing section 364 checks whether the two-sided scan page to be processed is a front side or a rear side on the basis of the to-be-processed page count value Ns at this time (Step S331).

Here, if it is determined that, due to the fact that the to-be-processed page count value Ns is an odd value, the two-sided scan page to be processed is the front side in two-sided scan ("FRONT SIDE" in FIG. S331), the scan image processing section 364 increments the to-be-processed page count value Ns to "+1," attempts to fetch the page [(Ns+1)-th page (a page next to Ns for which the page ID could not be extracted), and checks whether or not there is scan data of the page [(Ns+1)-th page] next to the Ns-th page for which the page ID cannot be extracted (Step S332).

Here, if it is determined that the scan data of the (Ns+1)-th page is not present (NO in Step S332), the operation returns to Step S350 shown in FIG. 12 to stop the operation, and its result is notified (Step S324), whereupon the processing ends.

On the other hand, if it is determined that the scan data of the (Ns+1)-th page is present (YES in Step S332), the scan image processing section 364 develops the scan data of that (Ns+1)-th page (Step S333), and effects the processing of extracting the page ID from the scan data of that page (Step S334).

Here, if the page ID cannot be acquired (NO in Step S335), the operation returns to Step S350 shown in FIG. 12 to stop the operation, and its result is notified (Step S324), whereupon the processing ends.

On the other hand, if the page ID could be acquired (YES in Step S335), the aforementioned developed data of that page is decoded to read the information of the rear-side mark presence identifier (Step S336b), and a check is made as to whether or not the value of the rear-side mark presence identifier thus read is "false" (Step S337b).

Here, if a determination result is obtained that the aforementioned rear-side mark presence identifier is not "false" (NO in Step S337b), the operation returns to Step S350 shown in FIG. 12 to stop the operation, and its result is notified (Step S324), whereupon the processing ends.

On the other hand, if a determination result is obtained that the aforementioned rear-side mark presence identifier is "false" (YES in Step S337b), the scan data of the Ns-th page for which the page ID cannot be extracted in the aforementioned Step S318 is ignored (deleted) (Step S338), and after the scan data of the (Ns+1)-th page is moved back to the scan data of the (Ns−1)-th page, the operation returns to Step S319 of FIG. 12, and the processing in Steps S315 to S318 is continued until it is determined in Step S319 that the processing of all pages is finished (YES in Step S319).

It should be noted that the above-described series of processing continuing from "FRONT SIDE" in Step S331 to S338 through "YES" in S332, S333, S334, "YES" in S335, S336b, and "YES" in S337b (in the same way as the processing continuing from "REAR SIDE" in Step S331 to S338 through S340, S336b, and "YES" in S337b, which will be described later) is processing for ensuing the following: After recognizing the fact that the page ID cannot be extracted from the scan data of the Ns-th page in the aforementioned Step S318 (see FIG. 12) is ascribable to the fact that that Ns-th page is a page corresponding to the rear side of a paper document whose final page was subjected to two-sided printing at the time of two-sided printing of an electronic document formed by an odd number of pages, in distinction from the case where the imparted page ID cannot be read due to the deterioration of the image and so on, and after it is confirmed that it is normal for the scan data of that Ns-th page to be absent, the scan data is deleted (ignored), and the page ID extraction processing of the scan data of the subsequent pages is continued without delay.

Meanwhile, in the above-described series of processing, if it is determined in Step S331 of FIG. 19 that, due to the fact that the to-be-processed page count value Ns is an even value, the two-sided scan page to be processed is the rear side in two-sided scan ("REAR SIDE" in FIG. S331), the scan image processing section 364 develops again the scan data of the page [(Ns−1)-th page] preceding the Ns-th page for which the page ID cannot be extracted (Step S340). Then, the scan image processing section 364 decodes the developed data, and reads the information of the rear-side mark presence identifier from the scan data of that (Ns−1)-th page (Step S336b), and a check is made as to whether or not the value of the rear-side mark presence identifier thus read is the value of "false" (Step S337b).

Here, if a determination result is obtained that the aforementioned rear-side mark presence identifier is not "false" (NO in Step S337b), the operation returns to Step S350 shown in FIG. 12 to stop the operation, and its result is notified (Step S324), whereupon the processing ends.

On the other hand, if a determination result is obtained that the aforementioned rear-side mark presence identifier is "false" (YES in Step S337b), the scan data of the Ns-th page for which the page ID cannot be extracted in the aforementioned Step S318 (see FIG. 12) is ignored (deleted), and the operation proceeds to page ID extraction processing (Step S338) of the scan data in and after the page [(Ns+1)-th page] next to that Ns-th page for which the page ID cannot be extracted.

As the transient processing in this case, if a determination result is obtained that the aforementioned rear-side mark presence identifier is "false" (YES in Step S337b), after the to-be-processed page count value Ns is first incremented to "+1," the operation returns to Step S319 of FIG. 12, and the processing in Steps S315 to S318 is continued until it is determined in Step S319 that the processing of all pages is finished.

Next, referring to FIGS. 20A, 20B, and 20C and FIGS. 21A, 21B, and 21C, a description will be given of specific examples of the series of paper document two-sided scan processing operation shown in FIGS. 12 and 19.

Using the similar manner to that of FIGS. 14A, 14B, and 14C and FIGS. 15A, 15B, and 15C, FIGS. 20A, 20B, and 20C and FIGS. 21A, 21B, and 21C in both cases conceptually (planarly) show an example of a case where the three paper documents 3411, 3412, and 3413 (see FIG. 17) obtained by subjecting the document 1 to two-sided printing are set in the order of the paper documents 3411, 3413, and 3412, and are subjected to two-sided scanning.

Of these, FIGS. 20A, 20B, and 20C show an example of the form of two-sided scanning when the paper document 3413, which is the result of two-sided printing of the final page (fifth page) of the document 1, is inserted between the paper document 3411, which is the result of two-sided printing of the first and second pages of the document 1, and the paper document 3412, which is the result of two-sided printing of the third and fourth pages of the document 1, in a state where the blank page (rear side) is first scanned in the two-sided scanning, and the front side is then scanned [in the state where the page number (Ns) of the to-be-processed scan page in the process of extracting the page ID by fetching the scan data for each page from the two-sided scan data after execution of two-sided scanning becomes an odd-numbered page (the third page in this example)]. On the other hand, FIGS. 21A, 21B, and 21C show an example of the form of two-sided scanning when the aforementioned paper document 3413 is inserted between the paper document 3411 and the paper document 3412 in a state where the front side is first scanned in the two-sided scanning, and the blank page (rear side) is then scanned [in the state where the page number (Ns) of the to-be-processed scan page becomes an even-numbered page (the fourth page in this example)].

In FIGS. 20A, 20B, and 20C, if two-sided scanning is executed in the order of the paper documents 3411, 3413, and 3412 (FIG. 20A), then the scan data of an image on the front side (F) of the paper document 3411 (the first two-sided scan original), the scan data of an image on the rear side (R) thereof, the scan data of an image on the rear side (R) of the paper document 3413 (the second two-sided scan original), the scan data of an image on the front side (F) thereof, the scan data of an image on the front side (F) of the paper document 3412 (the third two-sided scan original), and the scan data of an image on the rear side (R) thereof are sequentially outputted from the reader section 31. The scan data of the respective outputted pages are arranged in the order of output, and are held in the storage section 33 as the two-sided scan data of one job (two-sided scanning of the paper documents 3411, 3413, and 3412) portion.

Here, the scan data of the image on the front side (F) of the paper document 3411 (the first two-sided scan original), the scan data of the image on the rear side (R) thereof, the scan data of the image on the front side (F) of the paper document 3413 (the second two-sided scan original), the scan data of the image on the front side (F) of the paper document 3412 (the third two-sided scan original), and the scan data of the image on the rear side (R) thereof respectively contain added data [(the total number of pages Ntot=5, and the rear-side mark presence identifier=true), (the total number of pages Ntot=5, and the rear-side mark presence identifier=true), (the total number of pages Ntot=5, and the rear-side mark presence identifier=false), (the total number of pages Ntot=5, and the rear-side mark presence identifier=true), and (the total number of pages Ntot=5, and the rear-side mark presence identifier=true)], as shown in FIG. 20B, [the document data of each of the pages, the document ID=docu001, the page IDs= (P0011), (P0012), (P0013), (P0014), and (P0011) are not shown].

In addition, the added data of the aforementioned document data, the document ID, and the page ID are not contained in the scan data (scan data corresponding to the to-be-processed page Ns=3) of the image on the rear side (R) of the paper document 3413 (the second two-sided scan original).

As a result, subsequently, while the to-be-processed page Ns is incremented from "1" to "2," "3," "4," "5," and "6" in that order, the processing of extracting the page IDs is executed by sequentially fetching, from the scan data of one job portion in correspondence with the value of the Ns, the scan data of an image on the front side (F) of the paper document 3411 (the first two-sided scan original), the scan data of an image on the rear side (R) thereof, the scan data of an image on the rear side (R) of the paper document 3413 (the second two-sided scan original), the scan data of an image on the front side (F) thereof, the scan data of an image on the front side (F) of the paper document 3412 (the third two-sided scan original), and the scan data of an image on the rear side (R) thereof. In this page ID extraction processing, when the to-be-processed page count value reaches Ns=3, a determination is made that the page ID cannot be extracted from the scan data of the image on the rear side (R) of the paper document 3413 (the second sheet of tow-sided scan) (refer to NO in S318 of FIG. 12).

After this determination, in the scan image processing section 364, from the value of the to-be-processed page count value Ns=3 at the time of the determination, a determination is made that the page to be processed is the front side in two-sided scan (the second sheet of two-sided scanning) (refer to "FRONT SIDE" in S331 of FIG. 19), and the processing of extracting the page ID is effected by fetching the scan data of its rear side, i.e., the page [(Ns+1)=page 4] next to Ns (=3) (refer to S332 to S335 of FIG. 19).

At the time of this processing, since the page ID=P0015 (not shown) can be extracted from the scan data of (Ns+1) =page 4, the scan image processing section 364 continues to extract information of the rear-side mark presence identifier from the scan data of that fourth page (refer to YES in S335 and S336b of FIG. 19).

Then, the scan data of Ns=3, for which the extracted rear-side mark presence identifier was determined to be false and the page ID cannot be extracted, is deleted, and the page ID extraction processing of the scan data of the respective pages of Ns=4 and up to 6 is continued (refer to YES in S337b and S338 of FIG. 19).

In this example, the page IDs=P0015, P0013, and P0014 are respectively extracted from the scan data of the respective pages of the to-be-processed pages Ns=4, 5, and 6. After the page ID=P0014 is finally extracted, a determination is made that the processing of all pages of the two-sided scanning is finished, and the operation proceeds to document processing allowance/rejection control (refer to YES in S319 and S320 to S323 of FIG. 12).

In this document processing allowance/rejection control, an inquiry is made to the policy management device 40 about the authority over two-sided scan operation by using as keys the document ID=docu001 and the user ID respectively extracted from the scan data of all pages, and if it is determined that the authority is present, document processing (two-sided scan-in, two-sided copy, etc.) corresponding to the operation instructed in the aforementioned Step S311 (see FIG. 12) is executed.

In FIGS. 21A, 21B, and 21C, if two-sided scanning is executed in the order of the paper documents 3411, 3413, and 3412 (FIG. 21A), then the scan data of an image on the front side (F) of the paper document 3411 (the first two-sided scan original), the scan data of an image on the rear side (R) thereof, the scan data of an image on the front side (F) of the paper document 3413 (the second two-sided scan original), the scan data of an image on the rear side (R) thereof, the scan data of an image on the front side (F) of the paper document 3412 (the third two-sided scan original), and the scan data of an image on the rear side (R) thereof are sequentially outputted from the reader section 31. The scan data of the respective outputted pages are arranged in the order of output, and are held in the storage section 33 as the two-sided scan data of one job portion.

Here, the scan data of the image on the front side (F) of the paper document 3411 (the first two-sided scan original), die scan data of the image on the rear side (R) thereof, the scan data of the image on the front side (F) of the paper document 3413 (the second two-sided scan original), the scan data of the image on the front side (F) of the paper document 3412 (the third two-sided scan original), and the scan data of the image on the rear side (R) thereof respectively contain added data [(the total number of pages Ntot=5, and the rear-side mark presence identifier=true), (the total number of pages Ntot=5, and the rear-side mark presence identifier=true), (the total number of pages Ntot=5, and the rear-side mark presence identifier=false), (the total number of pages Ntot=5, and the rear-side mark presence identifier=true), and (the total number of pages Ntot=5, and the rear-side mark presence identifier=true)], as shown in FIG. 21B, [the document data of each of the pages, the document ID=docu001, the page IDs= (P0011), (P0012), (P0013), (P0014), and (P0015) are not shown].

In addition, the added data of the aforementioned document data, the document ID, and the page ID are not contained in the scan data (scan data corresponding to the to-be-processed page Ns=4) of the image on the rear side (R) of the paper document 3413 (the second two-sided scan original).

As a result, subsequently, while the to-be-processed page Ns is incremented from "1" to "2," "3," "4," "5," and "6" in that order, the processing of extracting the page IDs is executed by sequentially fetching, from the scan data of one job portion in correspondence with the value of the Ns, the scan data of an image on the front side (F) of the paper document 3411 (the first two-sided scan original), the scan data of an image on the rear side (R) thereof, the scan data of an image on the front side (F) of the paper document 3413 (the second two-sided scan original), the scan data of an image on the rear side (R) thereof, the scan data of an image on the front side (F) of the paper document 3412 (the third two-sided scan original), and the scan data of an image on the rear side (R) thereof. In this page ID extraction processing, when the to-be-processed page count value reaches Ns=4, a determination is made that the page ID cannot be extracted from the scan data of the image on the rear side (R) of the paper document 3413 (the second sheet of tow-sided scan) (refer to NO in S318 of FIG. 12).

After this determination, in the scan image processing section 364, from the value of the to-be-processed page count value Ns=4 at the time of the determination, a determination is made that the page to be processed is the rear side in two-sided scan (the second sheet of two-sided scanning) (refer to "REAR SIDE" in S331 of FIG. 19), and information of the rear-side mark presence identifier is extracted from the scan data of the third page by fetching the scan data of its rear side, i.e., the page [(Ns−1)=page 3] preceding Ns (=4) (refer to S336 of FIG. 19).

Then, the scan data of Ns=4, for which the extracted rear-side mark presence identifier was determined to be false and the page ID cannot be extracted, is deleted, and the page ID extraction processing of the scan data of the respective pages of Ns=4 and up to 6 is continued (refer to YES in S337*b* and S338 of FIG. 19).

In this example, the page IDs=P0015, P0013, and P0014 are respectively extracted from the scan data of the respective pages of the to-be-processed pages Ns=4, 5, and 6. After the page ID=P0014 is finally extracted, a determination is made that the processing of all pages of the two-sided scanning is finished, and the operation proceeds to document processing allowance/rejection control (refer to YES in S319 and S320 to S323 of FIG. 12).

In this document processing allowance/rejection control, an inquiry is made to the policy management device 40 about the authority over two-sided scan operation by using as keys the document ID=docu001 and the user ID respectively extracted from the scan data of all pages, and if it is determined that the authority is present, document processing (two-sided scan-in, two-sided copy, etc.) corresponding to the operation instructed in the aforementioned Step S311 (see FIG. 12) is executed.

Third Example

As for the system in accordance with a third example, in the system configuration shown in FIG. 1, a client terminal 10C and an image formation device 30C are used instead of the client terminal 10 and the image formation device 30, respectively. The document management device 20 and the policy management device 40 are configured by using ones similar to those of the first and second examples.

The client terminal 10C in terms of its functional block is identical to the client terminal 10 (see FIG. 2) in accordance with the first example. In particular, however, the application section 141 has a-function whereby a check is made as to whether the total number of pages of an electronic document instructed to be subjected to two-sided printing is an even number or an odd number, and if the total number of pages is an even number, a two-sided print job capable of two-sided printing is generated by adding to each page the information of the document ID, the page ID, and the like generated by the document-attribute-information generation section 144, whereas, if the total number of pages is an even number, a blank page is added next to the final page of that electronic document, and a two-sided print job capable of two-sided printing is generated by adding to that blank page the document ID and the page ID generated by the document-attribute-information generation section 144. The document-attribute-information generation section 144 has a function whereby the information of the document ID, the page ID of each page, etc. is generated as information to be added to each page on the basis of the electronic document data subject to printing at the time of two-sided printing, and if it is determined by the application section 141 that the total number of pages is an even number, a document ID and a page ID corresponding to the page (added page) added next to the final page are further generated.

Here, as the document ID corresponding to the aforementioned added page, information having a value of, for instance, "null" is generated. Similarly, as the page ID, information having a specific value of such as "00000" or "fffff" is generated.

In addition, the image formation device 30C in terms of its functional block is identical to the image formation device 30 (see FIG. 4) in accordance with the first example. However, the print controller 361 has a function whereby, on the basis of the two-sided print instruction (two-sided print job) of the electronic document from the client terminal 10C, the electronic document is subjected to two-sided printing for each page on each printing surface corresponding to the logical page of each page by adding thereto the information of such as the document ID and each page ID, and in the case of a print job in which a blank page has been added, that added age is printed next to the final page by adding thereto the document ID and the page ID corresponding to that added page.

In addition, the scan image processing section 364 is configured not to have the processing function provided in the image formation devices 30 and 30B in accordance with the first and second examples, in which, in a case where the page ID cannot be extracted from the scan data of the Ns-th page among the entire scan data obtained by the two-sided scanning of paper documents subjected to two-sided printing, those two-sided printed documents subject to scan are checked in the flow shown in FIGS. 13 and 19 (the fact that the Ns-th page whose page ID cannot be extracted is ascribable to the fact that that Ns-th page is a page corresponding to the rear side of a paper document whose final page was subjected to two-sided printing at the time of two-sided printing of an electronic document formed by an odd number of pages is recognized in distinction from the case where the imparted page ID cannot be read due to the deterioration of the image and so on).

In other words, the image formation device 30C is realized by a general image formation device which makes an inquiry to the policy management device 40 about the operational authority concerning the paper document on the basis of the page ID extracted from the scan data of each page obtained by performing two-sided scanning of two-sided printed paper documents, and which, if the operational authority is present, performs the processing of that scan data.

Processing functions of the respective functional blocks other than those described above in the client terminal 10C and the image formation device 30C are similar to those of the corresponding functional blocks in the client terminal 10 and the image formation device 30 in accordance with the first example.

Hereafter, a description will be given in due order of the document two-sided printing and two-sided scan processing in the system in accordance with this example.

Figure 22:
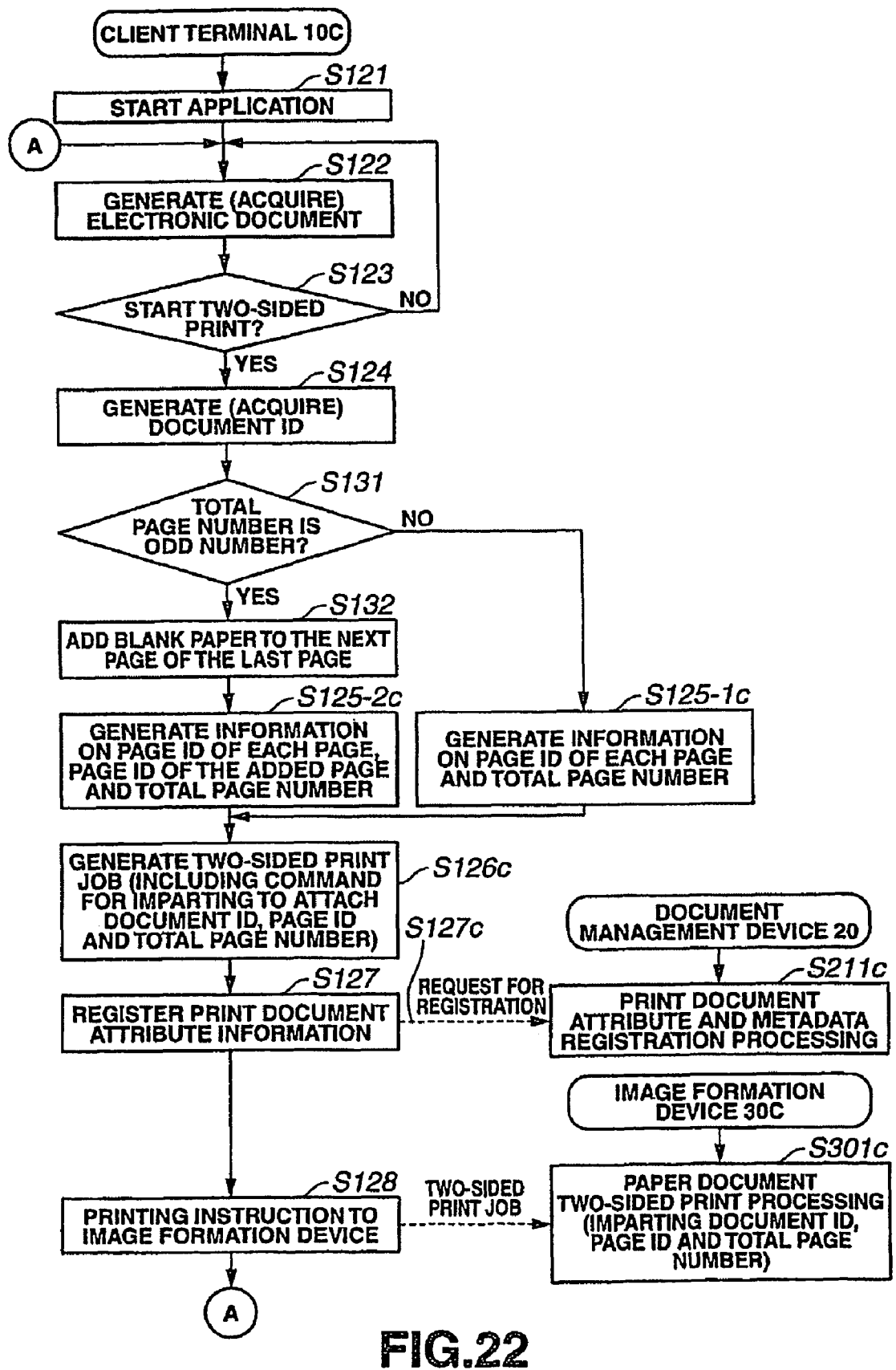
FIG. 22 is a diagram illustrating a control sequence related to the two-sided print processing of the electronic document in a third example.

FIG. 22 is a diagram illustrating a control sequence among the client terminal 10B, the document management device 20, and the image formation device 30C which are related to the two-sided print processing of an electronic document in the system of this example.

In FIG. 22, processing steps which are identical to those of the two-sided print processing in the first example (see FIG. 9) are denoted by the same reference numerals. It should be noted that, in the drawing, Steps S131 and S132 and each processing indicated by a reference character "b" at the end of a step numeral are peculiar to this example.

As shown in FIG. 22, in the client terminal 10C, after an application (application section 141) is started (Step S121), and electronic document data is generated or acquired (Step S122), if a two-sided print instruction is given (YES in Step S123), the document-attribute-information generation section 144 generates a document ID for identifying the electronic document for which the two-sided print instruction is given (Step S124).

Next, the application analyzes the total number of pages Ntot of the electronic document for which the two-sided print instruction is given, and checks whether or not the total number of pages Ntot of the electronic document is an odd number (Step S131).

Here, if it is determined that the total number of pages Ntot of the electronic document is an odd number (YES in Step S131), processing is effected to add one blank page next to the final page of that electronic document (Step S132).

Next, the fact that one blank page is added is notified to the document-attribute-information generation section 144, whereby the document-attribute-information generation section 144 generates page IDs respectively corresponding to the respective pages up to (Ntot), generates a page ID having a specific value corresponding to the added (Ntot+1)th page and a document ID having a specific value, and generates total-number-of-pages information having a value of the total number Ntot (Step S125-1c).

In contrast, if it is determined that the total number of pages Ntot of the electronic document is not an odd number (is an even number) (NO in Step S131), the document-attribute-information generation section 144 generates page IDs respectively corresponding to the respective pages up to (Ntot), and generates the total-number-of-pages information having a value of the total number Ntot (Step S125-2c).

After the information of the page IDs and the total number of pages is generated in the processing of "YES" in Step S131, S132, and S125-1c or the processing of "NO" in Step S131 and S125-2c, the print job generation section 143 generates a two-sided print job from the electronic document data generated (or acquired) in the aforementioned Step S122 and from respective information of the document ID, the page ID, and the total number of pages generated in the aforementioned Steps S124 and S125c (Step S126c).

Here, the print job generation section 143 generates a two-sided print job in which a rendering command is described to render on both sides the electronic document data, for which two-sided print instruction has been given, by imparting to each page a document ID, the total number of pages, and a page ID corresponding to each page, more specifically a command to render on both sides an image (two-dimensional barcode) in which an image of the electronic document data, as well as respective values of the document ID of that electronic document, the total number of pages, and the page ID having a hash value calculated on the basis of the electronic document data of that page, are held for each page individually identifiably (machine readably).

In particular, in this example, a print job is generated in which a command is described whereby, in a case where the total number of pages Ntot of the electronic document data, for which the two-sided print instruction is given, is an odd number and one blank page is added, as for the pages up to (Ntot), an image corresponding to the document data of the page is rendered in conjunction with a two-dimensional barcode containing the document ID, the total number of pages, and the page ID corresponding to that page, whereas, as for the added (Ntot+1)-th page, an image (no image: in a state of a blank sheet) corresponding to the document data of the page is rendered in conjunction with a two-dimensional barcode containing the total number of pages, and a document ID (e.g., null) generated in correspondence with the added page, and a dummy page ID (Step S125c).

After the above-described print job is generated, the information registration/acquisition section 142 executes processing (Step S127) for registering the document ID of the electronic document subject to printing and generated (or acquired) in Step S124, as well as the respective information of the page ID and the total number of pages generated in Step S125c in a respectively corresponding manner.

At the time of this registration processing of print document attribute information, the information registration/acquisition section 142 sends to the document management device 20 a registration request containing the respective information of the document ID of the aforementioned electronic document subject to printing, the page ID of the electronic document, and the total number of pages (Step S127c).

On the other hand, in the document management device 20, when the aforementioned print document attribute data registration request sent by the client terminal 10C is received by the processing request reception section 241, the information management section 242 extracts individually the respective information of the document ID, the page ID of each page, and the total number of pages contained in that registration request, and stores in a mutually corresponding manner the respective information in, for example, the print document attribute management table 222 of the storage section 22 (Step S211c: print document attribute and meta data registration processing).

Subsequently, the print job generation section 143 effects print instruction processing in which the two-sided print job generated in the aforementioned Step S126c is sent to the image formation device 30C through the communication interface (I/F) section 15 via the NW 60 (Step S128).

On the other hand, in the image formation device 30C, upon receiving through the communication interface (I/F) section 37 the aforementioned two-sided print job sent by the client terminal 10C, the print controller 361 executes the two-sided print processing (Step S301c) of the paper document on the basis of the two-sided print job.

In this two-sided print processing of paper documents, the print controller 361 analyzes the rendering command in the received two-sided print job, and print image data capable of rendering that electronic document data, together with the two-dimensional barcode containing the respective information of document ID, the total number of pages, the page ID corresponding to that page, is generated for each page by the image processing section 32 in accordance with the result of the analysis. On the basis of the print image data, an image of the electronic document data of the page, as well as a two-dimensional barcode image containing on each page the respective information of the document ID, the page ID, and the total number of pages, are printed out as a two-sided printed paper document formed on the front side or the rear side (each printing surface corresponding to the logical page of each page) of the recording sheet respectively corresponding to each page.

Figure 23:
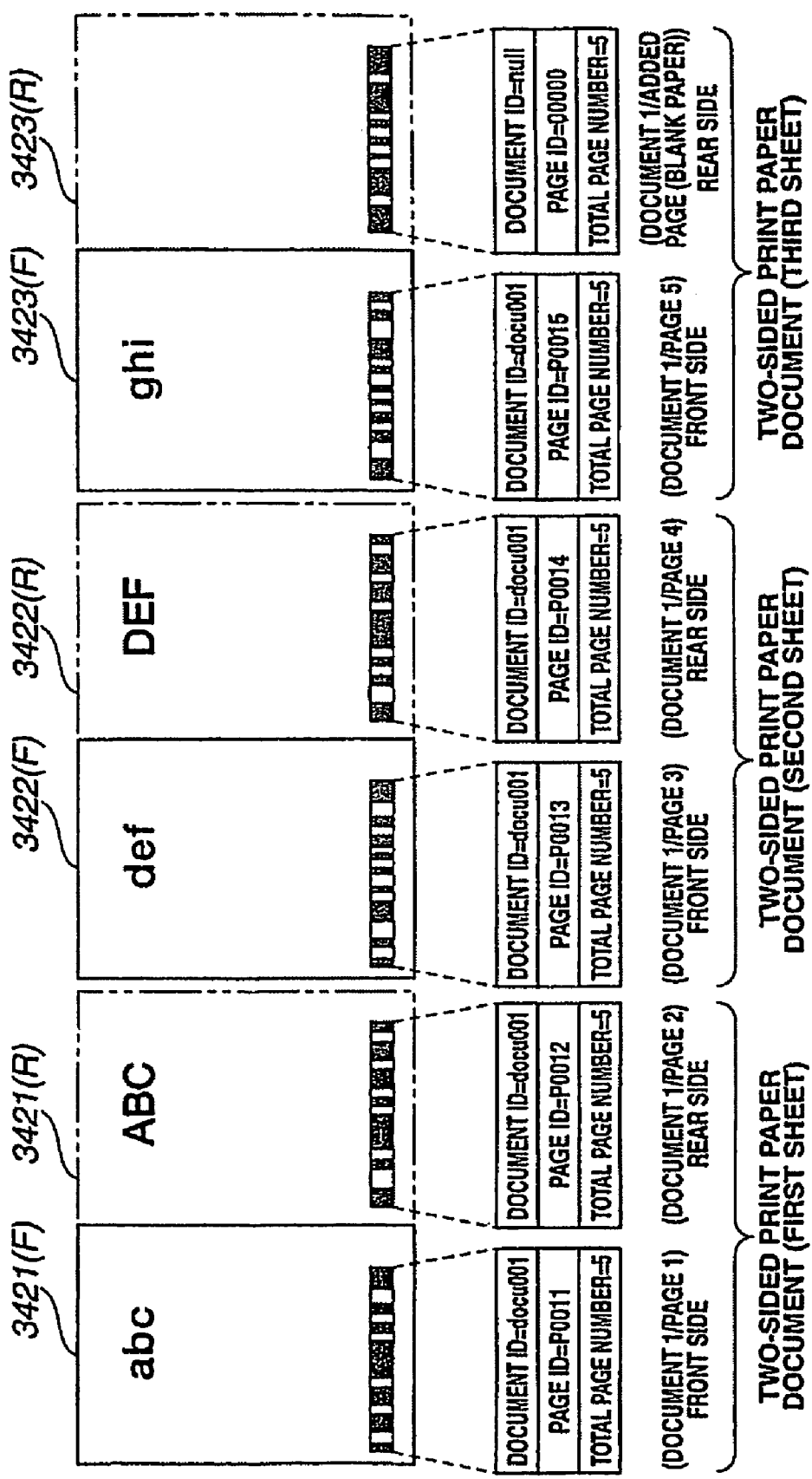
FIG. 23 is a conceptual diagram illustrating an example of a two-sided printout of paper documents by the image formation device in the third example.

FIG. 23 is a conceptual diagram illustrating an example of a two-sided printout of a paper document by the image formation device 30C in Step S301*c* of FIG. 22.

Using the similar manner to that of FIG. 10, FIG. 23 conceptually (planarly) shows an example at a time when the document 1 having the document ID of "docu001" and constituted by, for example, 5-page electronic document data is subjected to two-sided printing by using three recording sheets, and is printed out as paper documents 3421, 3422, and 3423.

As shown in FIG. 23, when the user instructs the two-sided printing of the document 1 from the client terminal 10C, the image formation device 30C, upon receiving the two-sided print job generated in Step S126*c* of FIG. 22 after undergoing Steps S132 and S125-1*c* thereof on the basis of that two-sided print instruction, first fetches a first recording sheet, and forms on its front side (F: printing surface corresponding to the first page) an image (=abc) corresponding to the electronic document data of the first page of that document 1, as well as images (in this example, these images are grouped together at one location and are formed by a two-dimensional barcode) of the respective information of the document ID (=docu001) of the document 1, the page ID (=P0011) corresponding to the first page, and the total number of pages (=5). Then, the image formation device 30C invertedly transports and fetches that first recording sheet, forms on its rear side (R: printing surface corresponding to the second page) an image (=ABC) corresponding to the electronic document data of the second page, as well as a two-dimensional barcode in which the respective information of the document ID (=docu001), the page ID (=P0012) corresponding to the second page, and the total number of pages (=5) is grouped together, and outputs the sheet as the paper document 3421 corresponding to the first two-sided printed sheet.

Next, the image formation device 30C fetches a second recording sheet, and forms on its front side (F: printing surface corresponding to the third page) an image (=def) corresponding to the electronic document data of the third page, as well as a two-dimensional barcode in which the respective information of the document ID (=docu001), the page ID (=P0013) corresponding to the third page, and the total number of pages (=5) are grouped together. Then, the image formation device 30C invertedly transports and fetches that second recording sheet, forms on its rear side (R: printing surface corresponding to the fourth page) an image (=DEF) corresponding to the electronic document data of the fourth page, as well as a two-dimensional barcode in which the respective information of the document ID (=docu001), the page ID (=P0014) corresponding to the fourth page, and the total number of pages (=5) is grouped together, and outputs the sheet as the paper document 3422 corresponding to the second two-sided printed sheet.

Further, the image formation device 30C fetches a third recording sheet, and forms on its front side (F: printing surface corresponding to the fifth page) an image (=ghi) corresponding to the electronic document data of the fifth page, as well as a two-dimensional barcode in which the respective information of the document ID (=docu001), the page ID (=P0015) corresponding to the fifth page, and the total number of pages (=5) are grouped together. Then, the image formation device 30C invertedly transports and fetches that third recording sheet, and outputs the sheet as the paper document 3423 corresponding to the third two-sided printed sheet, after forming on the rear side (R: blank sheet) of the recording sheet an image (no image: blank sheet) corresponding to the electronic document data (blank data) of the sixth page, i.e., the added page, as well as a two-dimensional barcode in which the respective information of the document ID (=null), the page ID (=00000) corresponding to the added page, and the total number of pages (=5) is grouped together.

It should be noted that, in a case where the document 1 formed by five pages is outputted in two-sided printing by the image formation device 30C as the paper document with the document ID, the page ID, and the total number of pages imparted to each page on the basis of the two-sided print instruction from the client terminal 10C, as shown in FIG. 23, in the document management device 20, the print document attribute information concerning that document 1 is held in the print document attribute management table 222 through the print document attribute and meta data registration processing in Step S211*c* of FIG. 22.

FIG. 24 is a table illustrating an example of information held in the print document attribute management table 222 of the document management device 20.

As shown in FIG. 24, at the time of the two-sided printing of the electronic document 1, the page IDs (P0011, P0012, P0013, P0014, and P0015) of the respective pages 1 to 5 of that document 1 are stored in a specific area (222-1*c*) of the print document attribute management table 222 in correspondence with the document ID (docu0001) of the electronic document 1, and the page ID (=00000) of the blank page added to the document 1 is also held therein in correspondence with the document ID (null) prepared in correspondence with that blank page. Further, information of the total number of pages (5) of the document 1 is also held in another area (222-2*c*), which is associated with the specific area (222-1*c*), in correspondence with the document ID (docu001) of that document 1.

Next, referring to a control sequence shown in FIG. 25, a description will be given of processing operation in a case where the paper documents (3421, 3422, and 3423) printed in the form shown in FIG. 23 is subjected to both-sided scanning by the image formation device 30C.

Figure 25:
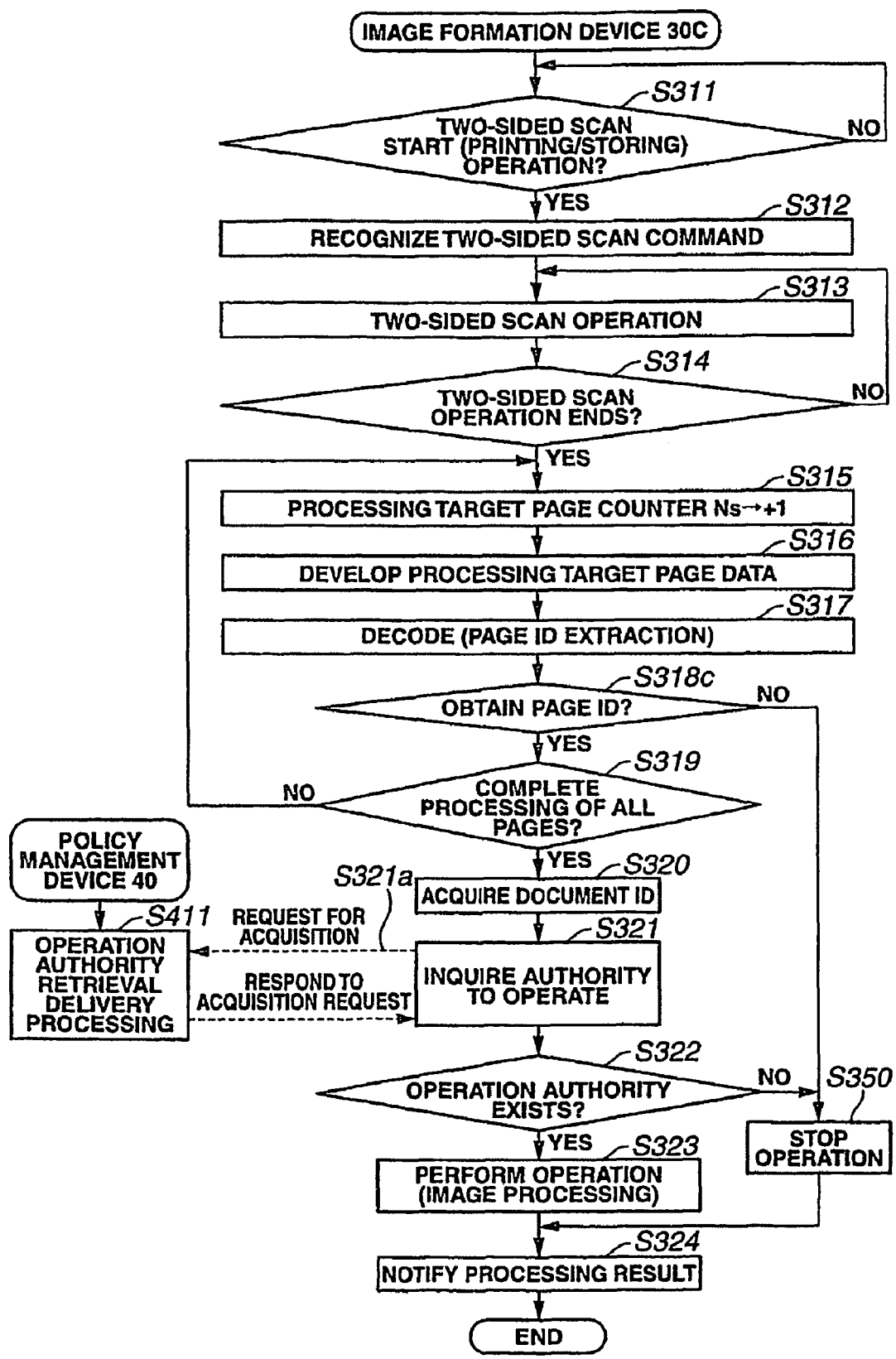
FIG. 25 is a diagram illustrating a control sequence related to two-sided scan processing operation of a paper document in the third example.

In FIG. 25, processing steps which are identical to those of the two-sided scan processing in the first example (see FIG. 12) are denoted by the same reference numerals.

In FIG. 25, the difference with the two-sided scan processing in accordance with the first example lies in that if, in Step S318*c*, the page ID is not extracted from the scan data of the to-be-processed page Ns (NO in Step S318*c*), the operation is stopped without performing the check processing of added information on the rear side (see FIG. 13) (Step S350).

The two-sided scan processing in accordance with this example is similar to the two-sided scan processing in accordance with the first example except for this aspect and the fact that the information added to the paper documents subject to scanning is different.

Here, referring to FIG. 25, a description will be given of the processing operation mainly of Step S318*c* by citing as an example a case in which the two-sided printed paper documents 3421, 3422, and 3423 shown in FIG. 23 are subjected to two-sided scanning in the order of the front side and the rear side of the paper document 3421, the front side and the rear side of the paper document 3423, and the front side and the rear side of the paper document 3422.

In the image formation device 30C, if two-sided scanning is executed in the order of the paper documents 3421, 3423, and 3422 in the above-described manner after undergoing Steps S311 to S314, the scan data of an image on the front side (F) of the paper document 3421 (the first two-sided scan original), the scan data of an image on the rear side (R) thereof, the scan data of an image on the front side (F) of the paper document 3423 (the second two-sided scan original), the scan data of an image on the rear side (R) thereof, the scan data of an image on the front side (F) of the paper document 3422 (the third two-sided scan original), and the scan data of an image on the rear side (R) thereof are sequentially outputted from the reader section 31. The scan data of the respective outputted pages are held in the storage section 33 as the two-sided scan data of one job (two-sided scanning of the paper documents 3421, 3423, and 3422) portion.

Here, the scan data of the image on the front side (F) of the paper document 3421 (the first two-sided scan original), the scan data of the image on the rear side (R) thereof, the scan data of the image on the front side (F) of the paper document 3423 (the second two-sided scan original), the scan data of the image on the rear side (R) thereof, the scan data of the image on the front side (F) of the paper document 3422 (the third two-sided scan original), and the scan data of the image on the rear side (R) thereof respectively contain the image data of each page and its added data [(document ID=docu001, page ID=P0011, and the total number of pages Ntot=5), (document ID=docu001, page ID=P0012, and the total number of pages Ntot=5), (document ID=docu001, page ID=P0015, and the total number of pages Ntot=5), (document ID=null, page ID=00000, and the total number of pages Ntot=5), (document ID=docu001, page ID=P0013, and the total number of pages Ntot=5), and (document ID=docu001, page ID=P0014, and the total number of pages Ntot=5)].

As a result, subsequently in Steps S315 to S319, while the to-be-processed page Ns is incremented from "1" to "2," "3," "4," "5," and "6" in that order, the processing of extracting the page IDs is executed by sequentially fetching, from the scan data of the Ns-th page, the scan data of an image on the front side (F) of the paper document 3421 (the first two-sided scan original), the scan data of an image on the rear side (R) thereof, the scan data of an image on the front side (F) of the paper document 3423 (the second two-sided scan original), the scan data of an image on the rear side (R) thereof, the scan data of an image on the front side (F) of the paper document 3422 (the third two-sided scan original), and the scan data of an image on the rear side (R) thereof. In this page ID extraction processing, when Ns is "1" and "2," the page ID=P0011, P0012 is respectively extracted, and it is determined that the page ID is respectively acquired in Step S318c (YES in Step S318c). Next, when Ns is "3" and "4," the page ID=P0015, 00000 is respectively extracted.

Here, when the page ID=P0015 is extracted, a determination is made in Step S318c that the page ID is acquired (YES in Step S318c), and the operation naturally proceeds to the extraction of the page ID of the next page. However, control is provided such that, even when the page ID=00000 of a specific value corresponding to a blank printing surface is extracted, a determination is made in Step S318c that the page ID is acquired (YES in Step S318c), and the operation proceeds to the extraction of the page ID of the next page.

Consequently, when Ns is "5" and "6," the page ID=P0013, P0014 is respectively extracted, and a determination is respectively made in Step S318c that the page ID is acquired (YES in Step S318c).

Then, after the page ID (=P0014) is extracted from the scan data of the page Ns=6, and a determination is made in Step S319 that the processing of all pages is finished (YES in Step S319), in Steps S320 to S323, the document ID corresponding to the page ID extracted from the scan data of each page in the aforementioned Steps S315 to 319 is acquired, and an inquiry is made to the policy management device 40 about the authority over that two-sided scan operation by using as keys that document ID and the user ID (already acquired at the time of user authentication before effecting the two-sided scan operation in Step S311). If it is determined that the authority is present, document processing (two-sided scan-in, two-sided copy, etc. of the paper document) corresponding to the two-sided scan operation effected in Step S311 is executed.

In addition to the above, the present invention is not limited to the examples described above and illustrated in the drawings, and may be implemented by being modified appropriately within the scope of the gist of the invention.

For example, although the information of the document ID, the page ID, the total number of pages, the page number, the two-sided print identifier, and the rear-side mark presence identifier is formed by a two-dimensional barcode, the present invention is not limited to the same, and may be formed by a QR code or other information (machine readable code).

In addition, a configuration may be provided such that, after an added image indicating a page ID is synthesized and printed, a page ID is extracted from image information read by the reading means, and a document ID, a total number of pages, a page number, a two-sided print identifier, and a rear-side mark presence identifier are acquired, as required.

In addition, although in the above-described examples a configuration is illustrated in which the image formation device 30 has both the function of outputting two-sided printed paper documents and the function of two-sided scanning of the two-sided printed paper documents, the image formation device 30 may be configured to have only the function of outputting two-sided printed paper documents.

In addition, the system configuration adopted in that case may be such that a printing device having the two-sided printing function is further disposed, a two-sided print instruction is given from the client terminal 10 to that printing device to output a two-sided printed paper document, and that two-sided printed paper document is subjected to two-sided scanning by the two-sided scanning function of the image formation device.

It should be noted that, in the present invention, it is also possible to configure an image processing system for executing the above-described processing by causing an image processing system having a communication function to execute the above-described operation or by installing on a computer a program for configuring the above-described means from a storage medium (CD-ROM, DVD-ROM, etc.) having that program stored therein and by executing the program. In addition, the medium for supplying the program may be a communication medium (a medium which temporarily or fluidly holds a program as in the case of a communications line or a communications system). For instance, the relevant program may be posed on a bulletin board service (BBS) of a communications network, and may be delivered through a communications line.

The present invention is applicable to an image processing device, an image processing system, a recording medium storing an image processing program an image processing method and a data signal, such as a multifunctional device in which added information is extracted from image information of each page obtained by the two-sided read scanning of a two-sided printed paper document of an electronic document subjected to two-sided printing by synthesizing added information of such as page identification information for each page, and in which processing of the image information is effected in accordance with operational authority corresponding to that added information.

The foregoing description of the exemplary embodiments of the present invention are provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
   a reading section that reads image information on both sides of a two-sided printed paper document;
   an inquiry section that inquires operational authority over a desired operation of the two-sided printed paper document on the basis of the image information on both sides of the two-sided printed paper document read by the reading section; and
   an execution section that executes the desired operation of the image information on both sides of the two-sided printed paper document if the operational authority over the desired operation of the two-sided printed paper document is present as a result of the inquiry by the inquiry section,
   wherein the two-sided printed paper document is printed on each printing surface corresponding to a logical page of a document subject to printing in a state in which an added image indicating document identification information, page identification information including a logical page number, a logical total number of pages, and a two-sided print attribute indicating that two-sided printing is executed is synthesized, and
   the image processing device further comprising:
   an extraction section that fetches in a reading-effected order the image information on the each printing surface that is read from both sides of the two-sided printed paper document by the reading section, and extracts information of the added image from the image information;
   a first determining section that, if the extraction section cannot extract the added image information, determines whether the added image information is included in the image information of a next printing surface when the reading-effected order of the printing surface from which the added image information cannot be extracted is an odd number, and determines whether the added image information is included in the image information of a preceding printing surface when the reading-effected order of the printing surface from which the added image information cannot be extracted is an even number;
   a second determining section that, if the first determining section determines that the added image information is included in the image information of the printing surface, determines whether the two-sided print attribute is imparted to the added image information included in the image information of the printing surface, and whether the logical page number included in the page identification information agrees with the logical total number of pages; and
   an image processing section that, if the second determining section determines that the two-sided print attribute is imparted to the added image information and that the logical page number agrees with the logical total number of pages, ignores the image information of the printing surface from which the extraction section cannot extract the added image information, and subjects image information of another printing surface to image processing.

2. The image processing device according to claim 1, wherein the inquiry section determines the operational authority over the desired operation of the two-sided printed paper document by inquiring an operational authority management device that manages the operational authority over the two-sided printed paper document on the basis of the document identification information of the added image information extracted from the image information of the printing surface by the extraction section.

3. The image processing device according to claim 1, further comprising:
   a notifying section that notifies an abnormality to stop the image processing by the image processing section if the first determining section determines that the added image information is not included in the image information of the printing surface or if the second determining section determines that the logical page number does not agree with the logical total number of pages.

4. An image processing device comprising:
   a reading section that reads image information on both sides of a two-sided printed paper document;
   an inquiry section that inquires operational authority over a desired operation of the two-sided printed paper document on the basis of the image information on both sides of the two-sided printed paper document read by the reading section; and
   an execution section that executes the desired operation of the image information on both sides of the two-sided printed paper document if the operational authority over the desired operation of the two-sided printed paper document is present as a result of the inquiry by the inquiry section,
   wherein the two-sided printed paper document is printed on each printing surface corresponding to a logical page of a document subject to printing in a state in which an added image indicating document identification information and page identification information including a logical total number of pages is synthesized and, if the logical total number of pages is an odd number, a rear-side presence identifier indicating that image information is not present on a rear side is imparted to the added image on the printing surface corresponding to a final logical page,
   the image processing device further comprising:
   an extraction section that fetches in a reading-effected order the image information on the each printing surface that is read from both sides of the two-sided printed paper document by the reading section, and extracts information of the added image from the image information;
   a first determining section in which, if the extraction section cannot extract the added image information, determines whether the added image information is included in the image information of a next printing surface when the reading-effected order of the printing surface from which the added image information cannot be extracted is an odd number, and determines whether the added image information is included in the image information of a preceding printing surface when the reading-effected order of the printing surface from which the added image information cannot be extracted is an even number;

a second determining section that, if the first determining section determines that the added image information is included in the image information of the printing surface, determines whether the rear-side presence identifier is imparted to the added image information included in the image information of the printing surface; and an image processing section that, if the second determining section determines that the rear-side presence identifier is imparted to the added image information, ignores the image information of the printing surface from which the extraction section cannot extract the added image information, and subjects image information of another printing surface to image processing.

5. The image processing device according to claim 4, wherein the inquiry section determines the operational authority over the desired operation of the two-sided printed paper document by inquiring an operational authority management device that manages the operational authority over the two-sided printed paper document on the basis of the document identification information of the added image information extracted from the image information of the printing surface by the extraction section.

6. The image processing device according to claim 4, further comprising:

a notifying section that notifies an abnormality to stop the image processing by the image processing section if the first determining section determines that the added image information is not included in the image information of the printing surface or if the second determining section determines that the rear-side presence identifier is not imparted.

7. An image processing device comprising:

a reading section that reads image information on both sides of a two-sided printed paper document;

an inquiry section that inquires operational authority over a desired operation of the two-sided printed paper document on the basis of the image information on both sides of the two-sided printed paper document read by the reading section; and an execution section that executes the desired operation of the image information on both sides of the two-sided printed paper document if the operational authority over the desired operation of the two-sided printed paper document is present as a result of the inquiry by the inquiry section, wherein the two-sided printed paper document is printed on each printing surface corresponding to a logical page of a document subject to printing in a state in which an added image indicating document identification information and page identification information including a logical total number of pages is synthesized and, if the logical total number of pages is an odd number, an added image indicating specific page identification information is imparted to a blank printing surface of a rear side of a final logical page, the image processing device further comprising:

an extraction section that extracts information of the added image from the image information of the each printing surface that is read from both sides of the two-sided printed paper document by the reading section; and an image processing section that, if the specific page identification information is included in the added image information extracted by the extraction section, ignores the image information of the printing surface, and subjects image information of another printing surface to image processing.

8. The image processing device according to claim 7, wherein the inquiry section determines the operational authority over the desired operation of the two-sided printed paper document by inquiring an operational authority management device that manages the operational authority over the two-sided printed paper document on the basis of the document identification information of the added image information extracted from the image information of the printing surface by the extraction section.

9. The image processing device according to claim 7, further comprising:

a notifying section that notifies an abnormality to stop the image processing by the image processing section if the added image information cannot be extracted by the extraction section.

10. An image processing system comprising:

an output device that outputs a two-sided printed paper document that is printed on each printing surface corresponding to a logical page of a document subject to printing in a state in which an added image indicating document identification information, page identification information including a logical page number, a logical total number of pages, and a two-sided print attribute indicating that two-sided printing is executed is synthesized;

an operational authority management device that manages operational authority over the two-sided printed paper document in correspondence with the document identification information; and an image formation device including a reading section that reads image information on both sides of the two-sided printed paper document; an inquiry section that inquires the operational authority management device about operational authority over a desired operation of the two-sided printed paper document on the basis of the image information on both sides of the two-sided printed paper document read by the reading section; and an execution section that executes the desired operation of the image information on both sides of the two-sided printed paper document if the operational authority over the desired operation of the two-sided printed paper document is present as a result of the inquiry by the inquiry section, the image formation device further including:

an extraction section that fetches in a reading-effected order the image information of the each printing surface that is read from both sides of the two-sided printed paper document by the reading section, and extracts information of the added image from the image information;

a first determining section that, if the extraction section cannot extract the added image information, determines whether the added image information is included in the image information of a next printing surface when the reading-effected order of the printing surface from which the added image information cannot be extracted is an odd number, and determines whether the added image information is included in the image information of a preceding printing surface when the reading-effected order of the printing surface from which the added image information cannot be extracted is an even number;

a second determining section that, if the first determining section determines that the added image information is included in the image information of the printing surface, determines whether the two-sided print attribute is imparted to the added image information included in the image information of the printing surface, and whether the logical page number included in the page identification information agrees with the logical total number of pages; and an image processing section that, if the second determining section determines that the two-sided print attribute is imparted to the added image information and that the logical page number agrees with the logical total number of pages, ignores the image information of the printing surface from which the extraction section cannot extract the added image information, and subjects image information of another printing surface to image processing.

11. An image processing system comprising:

an output device that outputs a two-sided printed paper document that is subjected to two-sided printing on each printing surface corresponding to a logical page of a document subject to printing in a state in which an added image indicating document identification information and page identification information including a logical total number of pages is synthesized and in a state in which, if the logical total number of pages is an odd number, a rear-side presence identifier indicating that image information is not present on a rear side is imparted to the added image on the printing surface corresponding to a final logical page;

an operational authority management device that manages operational authority over the two-sided printed paper document in correspondence with the document identification information; and an image formation device including a reading section that reads image information on both sides of the two-sided printed paper document; an inquiry section that inquires the operational authority management device about operational authority over a desired operation of the two-sided printed paper document on the basis of the image information on both sides of the two-sided printed paper document read by the reading section; and an execution section that executes the desired operation of the image information on both sides of the two-sided printed paper document if the operational authority over the desired operation of the two-sided printed paper document is present as a result of the inquiry by the inquiry section, the image formation device further including:

an extraction section that fetches in a reading-effected order the image information on the each printing surface that is read from both sides of the two-sided printed paper document by the reading section and extracts information of the added image from the image information;

a first determining section that, if the extraction section cannot extract the added image information, determines whether the added image information is included in the image information of a next printing surface when the reading-effected order of the printing surface from which the added image information cannot be extracted is an odd number, and determines whether the added image information is included in the image information of a preceding printing surface when the reading-effected order of the printing surface from which the added image information cannot be extracted is an even number;

a second determining section that, if the first determining section determines that the added image information is included in the image information of the printing surface, determines whether the rear-side presence identifier is imparted to the added image information included in the image information of the printing surface; and an image processing section that, if the second determining section determines that the rear-side presence identifier is imparted, ignores the image information of the printing surface from which the extraction section cannot extract the added image information, and subjects image information of another printing surface to image processing.

12. An image processing system comprising:

an output device that outputs a two-sided printed paper document that is subjected to two-sided printing on each printing surface corresponding to a logical page of a document subject to printing in a state in which an added image indicating document identification information and page identification information including a logical total number of pages is synthesized and in a state in which, if the logical total number of pages is an odd number, an added image indicating specific page identification information is imparted to a blank printing surface of a rear side of a final logical page;

an operational authority management device that manages operational authority over the two-sided printed paper document in correspondence with the document identification information; and an image formation device including a reading section that reads image information on both sides of the two-sided printed paper document from the two-sided printed paper document; an inquiry section that inquires the operational authority management device about operational authority over a desired operation of the two-sided printed paper document on the basis of the image information on both sides of the two-sided printed paper document read by the reading section; and an execution section that executes the desired operation of the image information on both sides of the two-sided printed paper document if the operational authority over the desired operation of the two-sided printed paper document is present as a result of the inquiry by the inquiry section, the image formation device further comprising:

an extraction section that extracts information of the added image from the image information of the each printing surface that is read from both sides of the two-sided printed paper document by the reading section; and an image processing section that, if the specific page identification information is included in the added image information extracted by the extraction section, ignores the image information of the printing surface, and subjects image information of another printing surface to image processing.

13. A non-transitory computer readable recording medium storing an image processing program that causes a computer to execute a process, the process comprising:

reading image information on both sides of a two-sided printed paper document in a state in which an added image indicating document identification information, page identification information including a logical page number, a logical total number of pages, and a two-sided print attribute indicating that two-sided printing is executed is synthesized on each printing surface corresponding to a logical page of a document subject to printing;

fetching in a reading-effected order the image information of the each printing surface that is read from both sides of the two-sided printed paper document, and extracting information of the added image from the image information;

determining, if the added image information cannot be extracted, whether the added image information is included in the image information of a next printing surface when the reading-effected order of the printing surface from which the added image information cannot be extracted is an odd number, and whether the added image information is included in the image information of a preceding printing surface when the reading-effected order of the printing surface from which the added image information cannot be extracted is an even number;

determining, if it is determined that the added image information is included in the image information of the printing surface, whether the two-sided print attribute is imparted to the added image information included in the image information of the printing surface, and whether the logical page number included in the page identification information agrees with the logical total number of pages; and ignoring, if it is determined that the two-sided print attribute is imparted to the added image information and that the logical page number agrees with the logical total number of pages, the image information of the printing surface from which the added image information cannot be extracted, and subjecting image information of another printing surface to image processing.

14. A non-transitory computer readable recording medium storing an image processing program that causes a computer to execute a process, the process comprising:

reading image information on both sides of a two-sided printed paper document in which an added image indicating document identification information and page identification information including a logical total number of pages is synthesized on each printing surface corresponding to a logical page of a document subject to printing and in which, if the logical total number of pages is an odd number, a rear-side presence identifier indicating that image information is not present on a rear side is imparted to the added image of the printing surface corresponding to a final logical page;

fetching in a reading-effected order the image information of the each printing surface that is read from both sides of the two-sided printed paper document, and extracting information of the added image from the image information;

determining, if the added image information cannot be extracted, whether the added image information is included in the image information of a next printing surface when the reading-effected order of the printing surface from which the added image information cannot be extracted is an odd number, and whether the added image information is included in the image information of a preceding printing surface when the reading-effected order of the printing surface from which the added image information cannot be extracted is an even number;

determining, if it is determined that the added image information is included in the image information of the printing surface, whether the rear-side presence identifier is imparted to the added image information included in the image information of the printing surface; and ignoring, if it is determined that the rear-side presence identifier is imparted to the added image information, the image information of the printing surface from which the added image information cannot be extracted, and subjecting image information of another printing surface to image processing.

15. A non-transitory computer readable recording medium storing an image processing program that causes a computer to execute a process, the process comprising:

reading image information on both sides of a two-sided printed paper document in which an added image indicating document identification information and page identification information including a logical total number of pages is synthesized on each printing surface corresponding to a logical page of a document subject to printing and in a state in which, if the logical total number of pages is an odd number, an added image indicating specific page identification information is imparted to a blank printing surface of a rear side of a final logical page;

extracting information of the added image from the image information of the each printing surface that is read from both sides of the two-sided printed paper document; and ignoring, if the specific page identification information is included in the extracted added image information, the image information of the printing surface, and subjecting image information of another printing surface to image processing.

16. An image processing method comprising:

reading image information on both sides of a two-sided printed paper document;

inquiring operational authority over a desired operation of the two-sided printed paper document on the basis of the image information on both sides of the read two-sided printed paper document read; and executing the desired operation of the image information on both sides of the two-sided printed paper document if the operational authority over the desired operation of the two-sided printed paper document is present as a result of the inquiry, wherein the two-sided printed paper document is printed on each printing surface corresponding to a logical page of a document subject to printing in a state in which an added image indicating document identification information, page identification information including a logical page number, a logical total number of pages, and a two-sided print attribute indicating that two-sided printing is executed is synthesized, and the image processing method further comprising:

fetching in a reading-effected order the image information of the each printing surface that is read from both sides of the two-sided printed paper document, and extracting information of the added image from the image information;

determining, if the added image information cannot be extracted, whether the added image information is included in the image information of a next printing surface when the reading-effected order of the printing surface from which the added image information cannot be extracted is an odd number, and whether the added image information is included in the image information of a preceding printing surface when the reading-effected order of the printing surface from which the added image information cannot be extracted is an even number;

determining, if it is determined that the added image information is included in the image information of the printing surface, whether the two-sided print attribute is imparted to the added image information included in the image information of the printing surface, and whether the logical page number included in the page identification information agrees with the logical total number of pages; and ignoring, if it is determined that the two-sided print attribute is imparted to the added image information and that the logical page number agrees with the logical total number of pages, the image information of the printing surface from which the added image information cannot be extracted, and subjecting image information of another printing surface to image processing.

17. A non-transitory computer readable recording medium storing an image processing program that causes a computer to execute a process, the process comprising:

reading image information on both sides of a two-sided printed paper document;

inquiring operational authority over a desired operation of the two-sided printed paper document on the basis of the image information on both sides of the read two-sided printed paper document read; and executing the desired operation of the image information on both sides of the two-sided printed paper document if the operational authority over the desired operation of the two-sided printed paper document is present as a result of the inquiry, wherein the two-sided printed paper document is printed on each printing surface corresponding to a logical page of a document subject to printing in a state in which an added image indicating document identification information, page identification information including a logical page number, a logical total number of pages, and a two-sided print attribute indicating that two-sided printing is executed is synthesized, and the process further comprising:

fetching in a reading-effected order the image information of the each printing surface that is read from both sides of the two-sided printed paper document, and extracting information of the added image from the image information;

determining, if the added image information cannot be extracted, whether the added image information is included in the image information of a next printing surface when the reading-effected order of the printing surface from which the added image information cannot be extracted is an odd number, and whether the added image information is included in the image information of a preceding printing surface when the reading-effected order of the printing surface from which the added image information cannot be extracted is an even number;

determining, if it is determined that the added image information is included in the image information of the printing surface, whether the two-sided print attribute is imparted to the added image information included in the image information of the printing surface, and whether the logical page number included in the page identification information agrees with the logical total number of pages; and ignoring, if it is determined that the two-sided print attribute is imparted to the added image information and that the logical page number agrees with the logical total number of pages, the image information of the printing surface from which the added image information cannot be extracted, and subjecting image information of another printing surface to image processing.

* * * * *